(12) United States Patent  
Sato et al.

(10) Patent No.: US 7,690,829 B2  
(45) Date of Patent: Apr. 6, 2010

(54) SURFACE LIGHT EMITTER AND DISPLAY APPARATUS

(75) Inventors: Akira Sato, Tokyo (JP); Manami Kuiseko, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 575 days.

(21) Appl. No.: 11/386,565

(22) Filed: Mar. 22, 2006

(65) Prior Publication Data

US 2006/0221634 A1     Oct. 5, 2006

(30) Foreign Application Priority Data

| Mar. 29, 2005 | (JP) | ............................ 2005-095708 |
| Oct. 5, 2005 | (JP) | ............................ 2005-292409 |
| Nov. 30, 2005 | (JP) | ............................ 2005-344899 |

(51) Int. Cl.  
*F21V 7/04* (2006.01)

(52) U.S. Cl. ..................... 362/606; 362/607; 362/97.2

(58) Field of Classification Search ................ 362/330, 362/333, 606, 607, 615, 617, 618, 629, 97.1, 362/97.2, 97.4; 385/146  
See application file for complete search history.

(56) References Cited

U.S. PATENT DOCUMENTS

| 5,428,468 | A | * | 6/1995 | Zimmerman et al. | ........ 362/607 |
| 6,997,595 | B2 | * | 2/2006 | Mi et al. | ...................... 362/606 |
| 2004/0108980 | A1 | * | 6/2004 | Yonekubo et al. | ............. 345/76 |
| 2007/0041701 | A1 | * | 2/2007 | Yang et al. | ................... 385/146 |
| 2007/0145892 | A1 | * | 6/2007 | Chen | ............................ 362/29 |

FOREIGN PATENT DOCUMENTS

| JP | 05-045505 | 2/1993 |
| JP | 09-063767 | 3/1997 |

* cited by examiner

*Primary Examiner*—Y My Quach Lee  
(74) *Attorney, Agent, or Firm*—Brinks Hofer Gilson & Lione

(57) ABSTRACT

The front luminance of the light emitted from a surface light emitter provided with a surface light emitting device is greatly enhanced. In a surface light emitter in which a light control sheet 10 having a concavoconvex structure provided on one of its surfaces is affixed on to the light emitting side surface of a surface light emitting device, the projections 12 on one surface of the above light control sheet gets small towards the light emitting side surface of the above surface light emitting device, not only the tip surfaces 12a of these projections 12 are affixed to the light emitting side surface, but also a transparent material with a lower refractive index than the above light control sheet is packed in the space part 13 formed between the projections of the above light control sheet and the light emitting side surface of the surface light emitting device.

23 Claims, 28 Drawing Sheets

SURFACE LIGHT EMITTER AND DISPLAY APPARATUS

This application is based on Japanese Patent Application No. 2005-095708 filed on Mar. 29, 2005, No. 2005-292409 filed on Oct. 5, 2005, No. 2005-344899 filed on Nov. 30, 2005, in Japanese Patent Office, the entire content of which is hereby incorporated by reference.

TECHNICAL FIELD

The present invention relates to surface light emitters provided with surface light emitting devices and to display apparatuses.

BACKGROUND OF THE INVENTION

In recent years, due to the increasing diversification of information technology equipment there is an increasing need for surface light emitting devices with low power consumption and small volume, and electroluminescent devices (hereinafter abbreviated as EL devices) which are one such surface light emitting devices are attracting a lot of attention.

Such EL devices are broadly classified into inorganic EL devices and organic EL devices depending on types of material used in them.

Further, in case of inorganic EL devices, generally a high electric field is applied to the light emitting section, and electrons collide with light emission centers being accelerated by that high electric field, thus the light emission centers are excited and cause the emission of light. On the other hand, in case of organic EL devices, electrons and holes are injected respectively from the electron injection electrode and hole injection electrode into the light emission layer, the organic material get into an excited state, and the emission of light is caused when this organic material returns from the excited state to the ground state. And organic EL devices have the advantage that they are capable of being driven at a lower voltage than the inorganic EL devices.

Further, in the case of organic EL devices, it is possible to obtain light emitting devices that emit light with the appropriate color tone by selecting appropriate light emitting materials, it is also possible to obtain white light by suitably combining the light emitting materials, and hence they can be expected to be used as the back light for liquid crystal display devices, etc.

Further, when used as the back light for liquid crystal display devices, etc., usually a front luminosity of 2000 to 4000 cd/m$^2$ is required. But when light is emitted using a surface light emitting device such as the above EL device, etc., the emitted light travels in all directions, and a lot of light is totally reflected at the light emitting side surface of the surface light emitting device and is kept in the interior of the device and hence it is difficult to obtain sufficient front luminosity. And particularly in the case of organic EL devices, there was the problem that in order to obtain sufficient light emission life it was only possible to obtain a front luminosity of about 1000 to 1500 cd/m$^2$.

Further, conventionally, when light is emitted from a surface light emitting device such as an organic EL device, in order to improve its front luminosity, proposals have been made to provide minute undulations in the light emitting side surface of the surface light emitting device (see, for example, Patent Document 1), or to the affix a flat member provided with undulations on the light emitting side surface of the surface light emitting device so that these undulations appear on the surface (see, for example, Patent Document 2).

However, if, in the above manner, minute undulations are provided on the light emitting side surface of surface light emitting devices, or if a flat member provided with undulations is affixed on the light emitting side surface of the surface light emitting device so that these undulations appear on the surface, there was the problem that light got dispersed due to the undulations on the surface and it was not yet possible to sufficiently increase the front luminosity.

Patent Document 1: Japanese Unexamined Patent Application Open to Public Inspection No. 9-63767

Patent Document 2: Japanese Unexamined Patent Application Open to Public Inspection No. 5-45505

SUMMARY

The present invention is intended to greatly improve the front luminosity of light emitted from the surface light emitter in a surface light emitter employing a surface light emitting device and a display apparatus employing such a surface light emitter.

In view of forgoing, an object of this invention is to solve at least one of the problems, and to provide new apparatus. The apparatus is a surface light emitter, comprising:

a surface light emitting device which emits light; and a light control sheet which is provided with a concavoconvex structure on at least one surface of the light control sheet and is attached to an emitting side surface of the surface light emitting device, wherein a projection of the concavoconvex structure on the one surface of the light control sheet gets small toward the emitting side surface of the surface light emitting device and has a plane part on the top of the projection, the plane part on the top of the projection is bonded to the emitting side surface of the surface light emitting device, and transparent material, whose refraction index is smaller than the light control sheet, is filled in a space between the projection of the light control sheet and the emitting side surface of the surface light emitting device.

According to another aspect of the present invention, the apparatus is a surface light emitter, comprising:

a surface light emitting device which emits light; and a light control sheet which is provided with a concavoconvex structure on at least one surface of the light control sheet and is attached to an emitting side surface of the surface light emitting device, wherein a projection of the concavoconvex structure on the one surface of the light control sheet gets large toward the emitting side surface of the surface light emitting device and has a plane part on the top of the projection, the plane part on the top of the projection is bonded to the emitting side surface of the surface light emitting device, and transparent material, whose refraction index is larger than the light control sheet, is filled in a space between the projection of the light control sheet and the emitting side surface of the surface light emitting device.

DETAILED DESCRIPTION OF THE PREFERRED EMBODIMENT

Next, the surface light emitters according to some preferred embodiments of the present invention are described in concrete terms referring to the attached drawings. However, the surface light emitter according to the present invention needs not to be restricted to those shown in the following preferred embodiments, but can be implemented by changing suitably without deviating from the scope and intent of the present invention.

Preferred Embodiment 1:

In the first preferred embodiment, as is shown in FIG. 1(A) and FIG. 1(B), a prism array sheet 10A is used as the light control sheet which is a transparent substrate 11 on one side of which are formed truncated square pyramid shaped projections 12 whose tip parts are shrunk and which are repeated successively in both the lateral and longitudinal directions. Further, in the present patent specification, the tip parts of the projections 12 being shrunk means that the projections 12 are formed so that they become gradually smaller as the distance from the prism array sheet 10A increases, and in examples shown in FIG. 1(B) and in FIG. 11 to be described later, this means that the shape is that of a shorter bottom parts.

Figure 2:
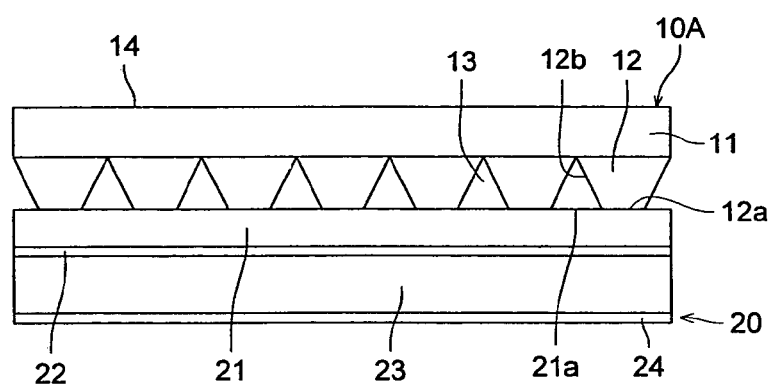
FIG. 2 is an outline side view diagram showing the surface light emitter according to the above first preferred embodiment.

Further, in the surface light emitter of this first preferred embodiment, as is shown in FIG. 2, a surface light emitting device 20 is used which has an organic EL device having an organic EL layer 23 and an opposing electrode 24 provided on the surface of a transparent substrate 21 having a transparent electrode 22, and the tip surfaces 12a of the truncated square pyramid shaped projections 12 in the above prism array sheet 10A are adhered on to the light emitting side surface 21a of this transparent substrate 21 which emits the light generated from this surface light emitting device 20.

In this manner, by adhering the tip surfaces 12a of the truncated square pyramid shaped projections 12 in the above prism array sheet 10A on to the light emitting side surface 21a of the surface light emitting device 20, not only that the projections 12 of the prism array sheet 10A become shrunk towards the light emitting side surface 21a of the surface light emitting device 20, but also the space part 13 between the projections 12 of the prism array sheet 10A and the light emitting side surface 21a of the surface light emitting device 20 gets filled with air which is a transparent material with a lower refractive index than the prism array sheet 10A. Further, when filling with air, which is a transparent material with a lower refractive index than the prism array sheet 10A, there is no need to seal with great care as in the case of filling with a liquid, and also the material is desirable in that it is possible to fill with air by merely manufacturing the surface light emitter in air without having to provide a special process.

Figure 3:
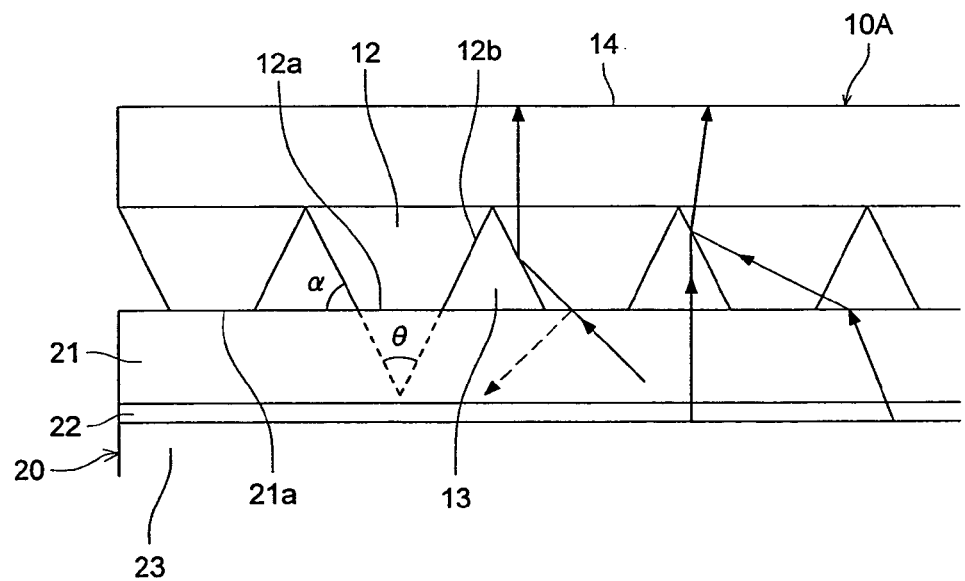
FIG. 3 is an explanatory diagram showing a partially enlarged view of the surface light emitter according to the above first preferred embodiment.

Further, when the tip surfaces 12a of the truncated square pyramid shaped projections 12 in the prism array sheet 10A is adhered to the light emitting side surface 21a of the surface light emitting device 20 in this manner and the above surface light emitting device 20 is made to emit light, as is shown in FIG. 3, the light, which would get totally reflected internally at the light emitting side surface 21a of the surface light emitting device 20 if the light control sheet were not provided, is not totally reflected at the part where the tip surfaces 12a of the projections 12 of the prism array sheet 10A is adhered but is guided into the inside of this prism array sheet 10A.

Further, most of the light guided in this manner in to the interior of the prism array sheet 10A is reflected at the inclined surfaces 12b of the projections 12 whose surfaces are the boundary between the space part 13 and the projections 12 that are shrunk towards the light emitting side surface 21a of the surface light emitting device 20, and this reflected light is guided to the light emitting side surface 14 of the prism array sheet 10A and is emitted from there. In addition, as is shown in FIG. 3, even if the light is emitted from the part of the light emitting side surface 21a at which the tip surfaces 12a of the projections 12 of the prism array sheet 10A are not adhered, the light that is emitted vertically from the light emitting side surface 21a has its direction of propagation modified slightly at the inclined surfaces 12b of the projections 12 but will be emitted towards the front of the prism array sheet 10A, and the light that is emitted at right angles to the inclined surface 12b of the projections 12 at the prism array sheet 10A from the light emitting side surface 21a are guided into the interior of the projections 12 from this inclined surfaces 12b and are reflected at the opposite inclined surface 12b of the projection 12 and is emitted towards the front of the prism array sheet 10A.

Here, in order to guide suitably the light that is totally reflected at the light emitting side surface 21a of the surface light emitting device 20 when the above light control sheet is not provided into the interior of the prism array sheet 10A from the tip surfaces 12a of the above projections 12, it is desirable to make the difference between the refractive index of this prism array sheet 10A and the refractive index of the above surface light emitting device 20 at the light emitting side surface 21a less than 0.2.

Further, at the time of providing truncated square pyramid shaped projections 12 in the above type of prism array sheet 10A, if the apex angle θ at the mutual intersection of the inclined surfaces 12b of this projection 12 becomes large and the inclination angle α of the inclined surface 12b of the projection with the light emitting side surface 21a of the above surface light emitting device 20 becomes too small, even if the light that would get totally reflected at the light emitting side surface 21a of the surface light emitting device 20 if the light control sheet were not provided gets guided into the interior of this prism array sheet 10A, this light does not impinge on the inclined surfaces 12b of the projections 12 but will be guided to the light emission surface 14 of the prism array sheet 10A, and will be totally reflected at the light emission surface 14 of the prism array sheet 10A and will be returned to the device, and hence the intensity of the light emitted from the light emission surface 14 of the prism array sheet 10A gets reduced.

On the other hand, if the apex angle θ at the mutual intersection of the inclined surfaces 12b of this projection 12 becomes small and the inclination angle α of the inclined surface 12b of the projection with the light emitting side surface 21a of the above surface light emitting device 20 becomes too large, the light that is guided into the prism array sheet 10A in the above manner is not reflected at the inclined surfaces 12b of the projections 12 but passes through these projections 12 and is guided to the space part 13, further passes through the space part 13 and is guided again into the interior of the prism array sheet 10A, and this light is totally reflected at the light emitting side surface 14 of the above type of prism array sheet 10A, and hence the intensity of the light emitted from the light emission surface 14 of the prism array sheet 10A gets reduced.

Therefore, it is desirable that the apex angle θ at the mutual intersection of the inclined surfaces 12b of this projection 12 satisfies the condition of $(1/n-0.35)<\sin\theta<(1/n+0.3)$, where n is the refractive index of this prism array sheet 10A for a light of wavelength 550 nm, and more desirably the condition of $1/n<\sin\theta<(1/n+0.25)$.

Further, the possible range of the height h of the above projections 12 varies depending on the above apex angle θ of the inclined surfaces 12b of this projection 12 and on the pitch p of the projections 12, and in general if the height h of the projections 12 is too small, even if the light that would get totally reflected at the light emitting side surface 21a of the surface light emitting device 20 if the light control sheet were not provided gets guided into the interior of this prism array sheet 10A, this light does not impinge on the inclined surfaces 12b of the projections 12 but will be guided to the light emission surface 14 of the prism array sheet 10A, and will be totally reflected at the light emission surface 14 of the prism array sheet 10A and will be returned to the device. On the other hand, if the height h of the projections 12 is too large, not only there will be parts that do not utilize the reflection of light at the inclined surfaces 12b of the projections 12 but also, if the pitch p of the projections 12 is the same, the area of the tip part 12a of the projections that is adhered to the light emitting side surface 21a of the surface light emitting device 20 becomes small, and hence the amount of light guided into the interior of this prism array sheet 10A becomes small. Therefore, it is desirable that the height h of these projections satisfies the condition of $0.28p \leq h \leq 1.1p$ with respect to the pitch p of the projections 12.

Further, in the surface light emitter according to this first preferred embodiment, although an organic EL device was used as the surface light emitting device 20, it is also possible to use an inorganic EL device as long as the surface light emitting device 20 emits light from the surface, but it is particularly desirable to use organic EL devices with which it is possible to expect a large improvement in the brightness.

Figure 4:
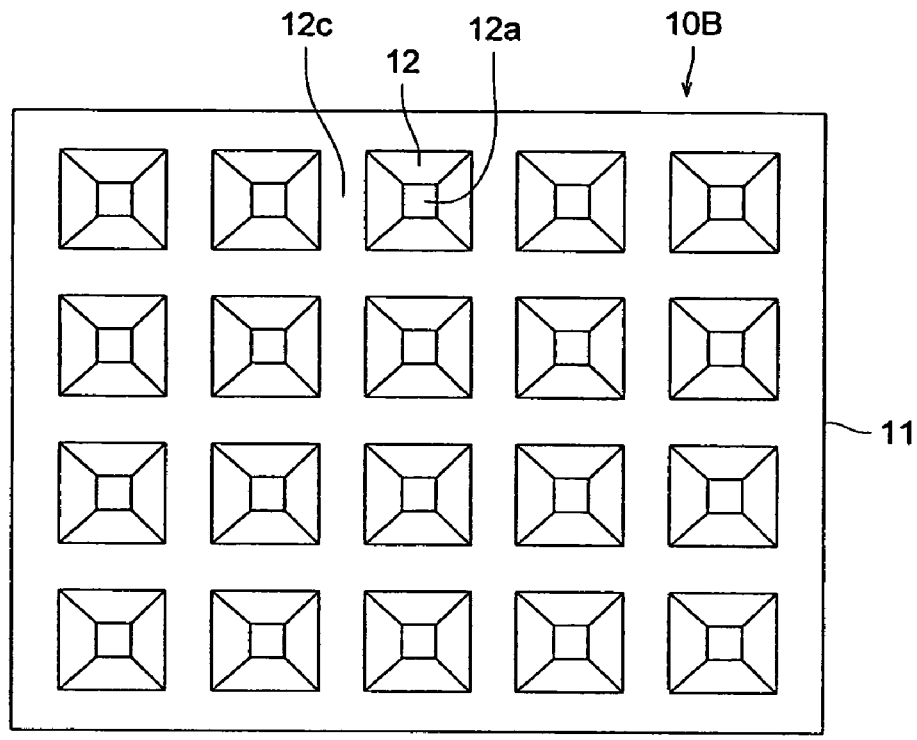
FIG. 4(A) is a plan view diagram of the surface on the side opposite to the light emitting side surface of the light control sheet used in the surface light emitter according to the second preferred embodiment of the present invention.
FIG. 4(B) is a side view diagram of the light control sheet used in the surface light emitter according to the second preferred embodiment of the present invention.
Figure 4:
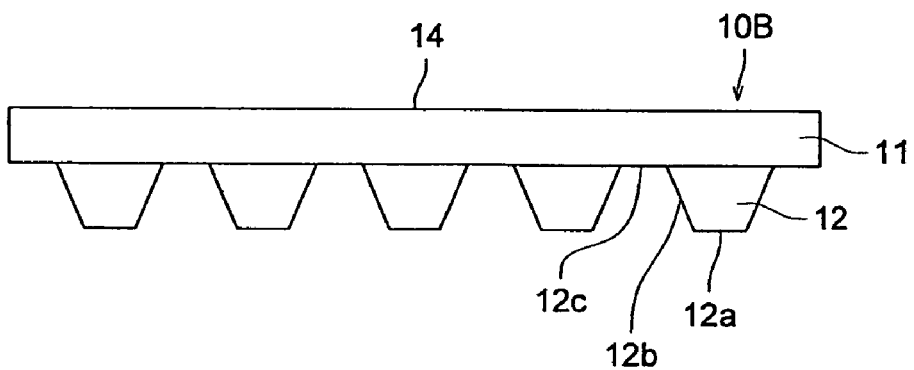

Preferred Embodiment 2:

In the second preferred embodiment, as is shown in FIG. 4(A) and FIG. 4(B), similar to the case of the above first preferred embodiment, as the light control sheet, a prism array sheet 10B is used, a prism array sheet in which not only truncated square pyramid shaped projections 12 shrunk towards the tip side on one surface of a transparent substrate 11 but also a plurality of these projections 12 formed in the lateral and longitudinal directions with prescribed spacings are provided.

Figure 5:
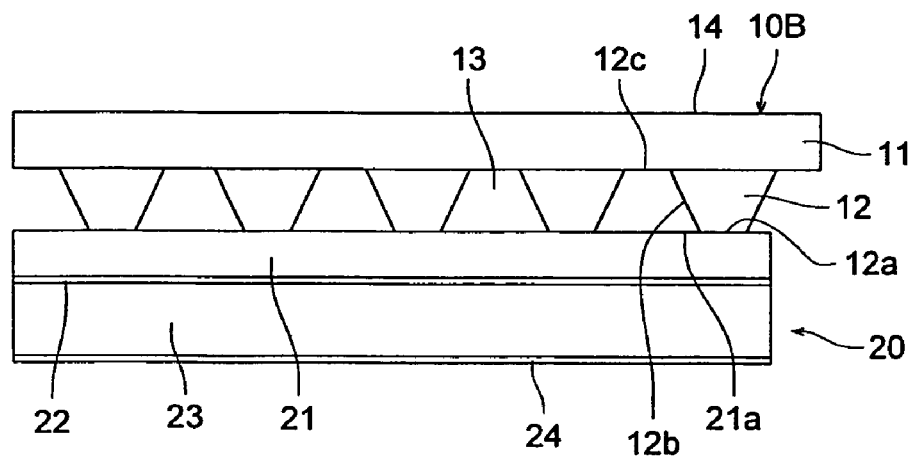
FIG. 5 is an outline side view diagram showing the surface light emitter according to the above second preferred embodiment.

Further, in the surface light emitter according to this second preferred embodiment, as is shown in FIG. 5, similar to the above first preferred embodiment, the tip surface 12a of the projections 12 with a truncated square pyramid shape in the above prism array sheet 10B is adhered to the light emitting side surface 21a of the transparent substrate 21 that emits the light emitted by the surface light emitting device 20.

Figure 6:
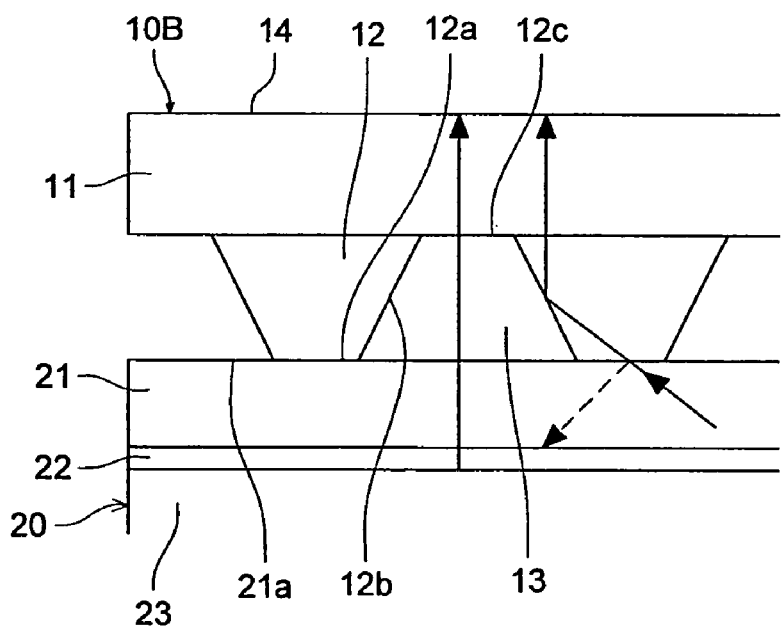
FIG. 6 is an explanatory diagram showing a partially enlarged view of the surface light emitter according to the above second preferred embodiment.

By doing this, in the surface light emitter according to the second preferred embodiment, as is shown in FIG. 6, similar to the surface light emitter in the first preferred embodiment, the light that would get totally reflected internally at the light emitting side surface 21a of the surface light emitting device 20 if the light control sheet were not provided is not totally reflected at the part where the tip surfaces 12a of the projections 12 of the prism array sheet 10B is adhered but is guided into the interior of this prism array sheet 10B, most of the light guided in this manner in to the interior of the prism array sheet 10B is reflected at the inclined surfaces 12b of the projections 12 that are shrunk towards the light emitting side surface 21a of the surface light emitting device 20, and this reflected light is guided to the light emitting side surface 14 of the prism array sheet 10B and is emitted from there.

Further, in the surface light emitter of this second preferred embodiment, flat surfaces 12c are formed between the projections 12 in the above prism array sheet 10B, the light guided vertically to these flat surfaces 12c via the space part 13 between these projections 12 and the light emitting side surface 21a of the surface light emitting device 20 does not get dispersed but is guided to the interior of the prism array sheet 10B and get directly emitted from its light emitting side surface 14.

Further, in providing the projections 12 in the prism array sheet 10B in the above manner with prescribed spacings in the lateral and longitudinal directions, while it becomes easier for the light guided to the space part 13 between the projections 12 to be guided to the inclined surfaces 12b of the projections 12 and to get dispersed if the spacing between these projections 12 becomes smaller thereby making the area small of the flat surfaces 12c, if the spacing between these projections 12 becomes larger thereby making the area large of the flat surfaces 12c, the area of the tip surface 12a of the projections 12 of the prism array sheet. 10B adhered to the light emitting side surface 21a of the surface light emitting device 20 small, and hence the light that gets totally reflected at the light emitting side surface 21a of the surface light emitting device 20 becomes larger. Therefore, it is desirable that the ratio of area of the flat surface 12c to the area of the tips surface 12a of the above projections 12 is in the range of 0.125 to 8.0.

Figure 7:
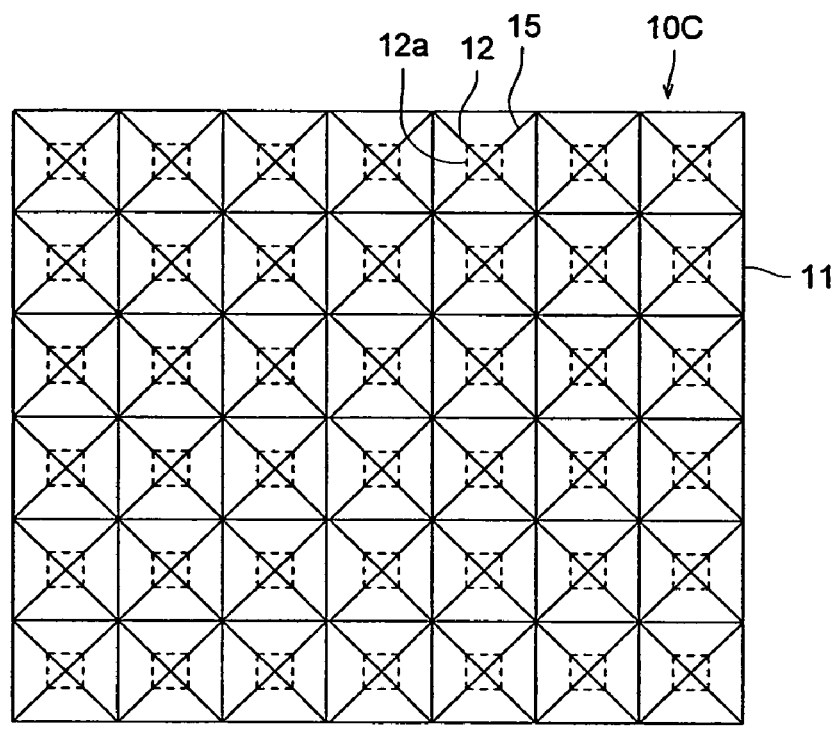
FIG. 7(A) is a plan view diagram of the light emitting side surface of the light control sheet used in the surface light emitter according to the third preferred embodiment of the present invention.
FIG. 7(B) is a side view diagram of the light control sheet used in the surface light emitter according to the third preferred embodiment of the present invention.
Figure 7:
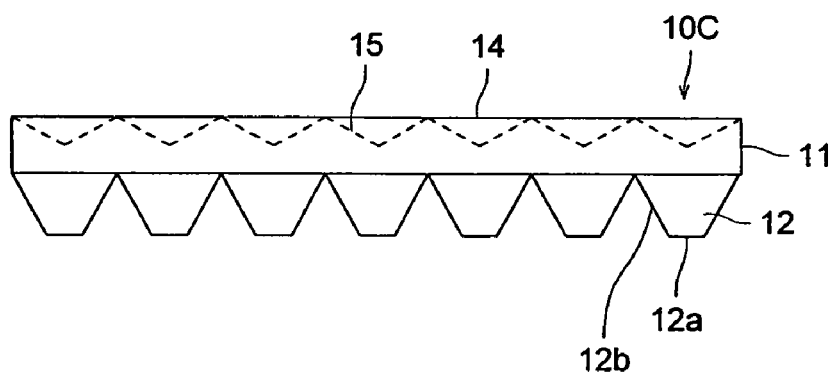

Preferred Embodiment 3:

In the third preferred embodiment, as is shown in FIG. 7(A) and FIG. 7(B), similar to the case of the above first preferred embodiment, as the light control sheet, a prism array sheet 10C is used, a prism array sheet in which truncated square pyramid shaped projections 12 shrunk towards the tip side on one surface of a transparent substrate 11 and square pyramid shaped depression parts 15 formed on the light emitting side surface 14 of the prism array sheet 10C corresponding to the truncated square pyramid shaped projections 12 on the side opposite to the side on which the plurality of these projections 12 are provided in the lateral and longitudinal directions.

Figure 8:
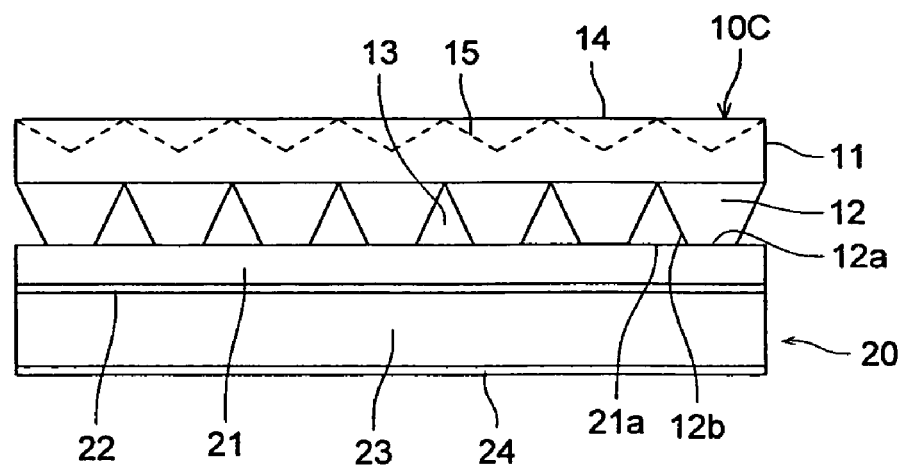
FIG. 8 is an outline side view diagram showing the surface light emitter according to the above third preferred embodiment.

Here, in the surface light emitter according to this third preferred embodiment, as is shown in FIG. 8, similar to the above first preferred embodiment, the tip surface 12a of the projections 12 with a truncated square pyramid shape in the above prism array sheet 10C is adhered to the light emitting side surface 21a of the transparent substrate 21 that emits the light emitted by the surface light emitting device 20.

By doing this, in the surface light emitter according to the third preferred embodiment, similar to the surface light emitter in the first preferred embodiment, the light that would get totally reflected internally at the light emitting side surface 21a of the surface light emitting device 20 if the light control sheet were not provided is not totally reflected at the part where the tip surfaces 12a of the projections 12 of the prism array sheet 10C is adhered but is guided into the interior of this prism array sheet 10C, most of the light guided in this manner in to the interior of the prism array sheet 10C is reflected at the inclined surfaces 12b of the projections 12 that are shrunk towards the light emitting side surface 21a of the surface light emitting device 20, and this reflected light is guided to the light emitting side surface 14 of the prism array sheet 10C and is emitted from there.

Further, in the surface light emitter of this third preferred embodiment, since square pyramid shaped depression parts 15 are provided as mentioned above in the light emitting side surface 14 of the prism array sheet 10C, the quantity of light that gets totally reflected at the light emitting side surface 14 of this prism array sheet 10C becomes smaller, and hence the quantity of light that is emitted from the light emitting side surface 14 of the prism array sheet 10C increases.

Further, as in this third preferred embodiment, when not only truncated square pyramid shaped projections 12 shrunk towards the tip side on one surface of a transparent substrate 11 are formed successively in the lateral and longitudinal directions but also square pyramid shaped depression parts 15 are formed on the light emitting side surface 14 of the prism array sheet 10C on the other side opposite to and so as to correspond to the projections 12, it is possible to make the square pyramid shaped depression parts 15 formed on the light emitting side surface 14 opposite to the side on which the projections 12 are formed to correspond in position to the projections 12, or the positions of the square pyramid shaped depression parts 15 in the light emitting side surface 14 can be shifted with respect to the positions of the truncated square pyramid shaped projections 12, or arrangement of the square pyramid shaped depression parts 15 can be made at an angle with respect to the arrangement of the truncated square pyramid shaped projections 12 so that the positions of the truncated square pyramid shaped projections 12 do not coincide with the positions of the square pyramid shaped depression parts 15. Further, the former case is somewhat advantageous in that the luminosity becomes better as compared to the latter case.

Further, when providing square pyramid shaped depression parts 15 on the light emitting side surface 14 on the side opposite to the side on which the plurality of truncated square pyramid shaped projections 12 are formed in the lateral and longitudinal directions, it is desirable that the ratio of the thickness of the shallowest part of the above substrate 11 to the height of the truncated square pyramid shaped projections 12 described above is in the range of 0.2 to 1.2. This is because, if the thickness of the substrate becomes too large, the light reflected at the inclined surfaces 12b of the truncated square pyramid shaped projections 12 of the prism array sheet 10C described above gets scattered widely, light gets guided to and scattered at parts other than the depression parts 15 corresponding to these truncated square pyramid shaped projections 12 and reduces the quantity of light emitted from the light emitting side surface 14 of the prism array sheet 10C, and on the other hand, if the thickness of the substrate 11 is too small, the strength of the prism array sheet 10C goes down.

Figure 9:
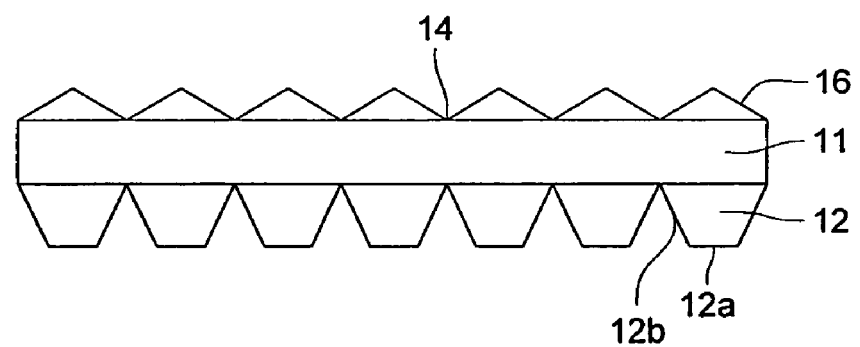
FIG. 9 is a side view diagram showing a modified example of the light control sheet used in the surface light emitter according to the above third preferred embodiment.

Further, in this third preferred embodiment, although the prism array sheet 10C was one in which square pyramid shaped depression parts 15 are formed on the light emitting side surface 14 on the other side opposite to the surface on which truncated square pyramid shaped projections 12 are formed successively in the lateral and longitudinal directions, it is not necessary to restrict particularly the concavoconvex structure provided on the light emitting side surface 14, but, as is shown in FIG. 9, it is possible to square pyramid shaped projections 16 on the light emitting side surface 14 opposite to the side on which the truncated square pyramid shaped projections 12 are formed, or, although not shown in the figure, it is also possible to provide triangular pillar shaped projections or depressions. Further, as is shown in FIG. 9, when providing square pyramid shaped projections 16 on the side opposite to that on which the truncated square pyramid shaped projections 12 are formed successively in the lateral and longitudinal directions, the truncated square pyramid shaped projections 12 and the square pyramid shaped projections 16 on the light emitting side surface 14 can be in identical positions, or can be no different positions, but the latter would be preferable in that the accuracy would be somewhat better than the former.

Figure 1:
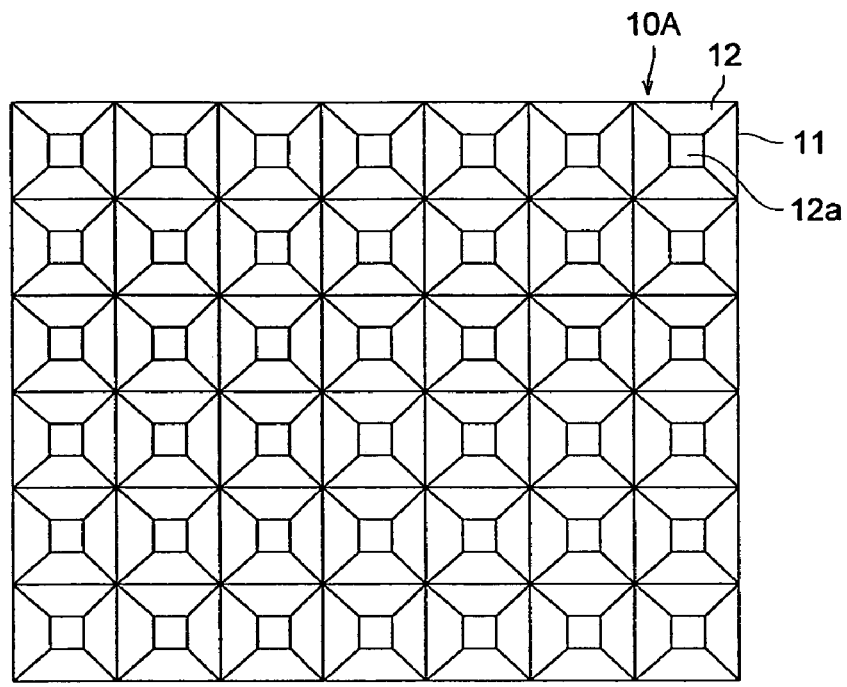
FIG. 1(A) is a plan view diagram of the surface on the side opposite to the light emitting side surface of the light control sheet used in the surface light emitter according to the first preferred embodiment of the present invention.
FIG. 1(B) is a side view diagram of the light control sheet used in the surface light emitter according to the first preferred embodiment of the present invention.
Figure 1:
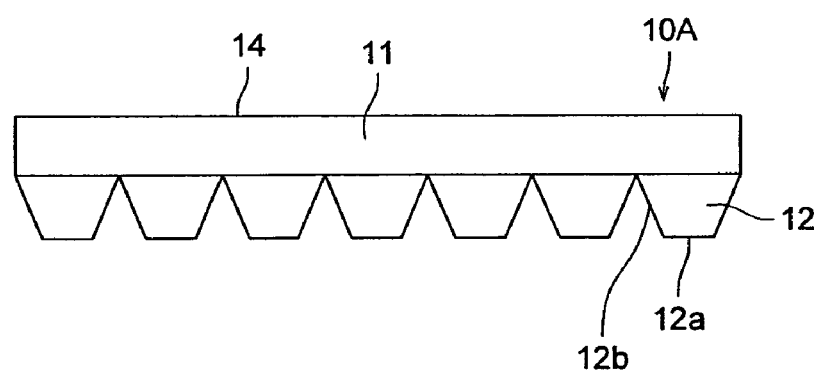
Figure 10:
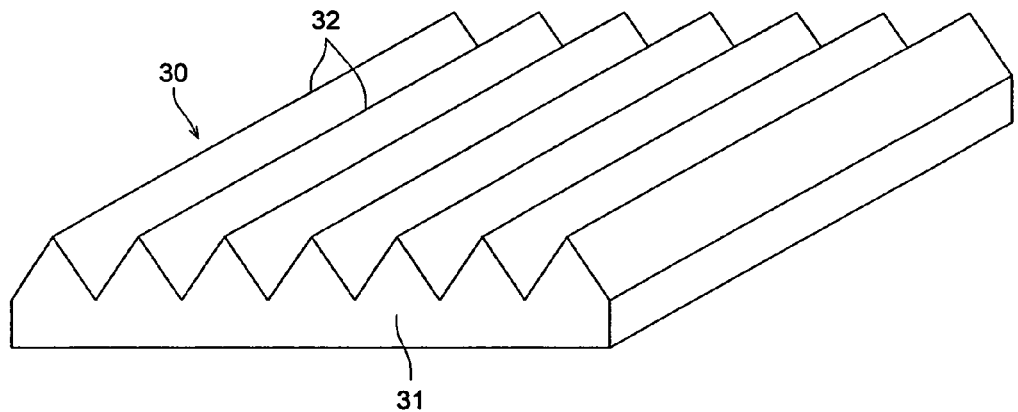
FIG. 10 is a perspective view diagram of the second light control sheet used in the surface light emitter according to the fourth preferred embodiment of the present invention.

Preferred Embodiment 4:

In the fourth preferred embodiment, as is shown in FIG. 1(A) and FIG. 1.(B), similar to the case of the above first preferred embodiment, as the light control sheet, not only a prism array sheet 10A in which are provided a plurality of truncated square pyramid shaped projections 12 shrunk towards the tip side on one surface of a transparent substrate 11 is used, but also as a second light control sheet is used, as is shown in FIG. 10, a second prism array sheet 30 in which triangular pillar shaped projections 32 are formed successively on one side of a transparent substrate 31.

Figure 11:
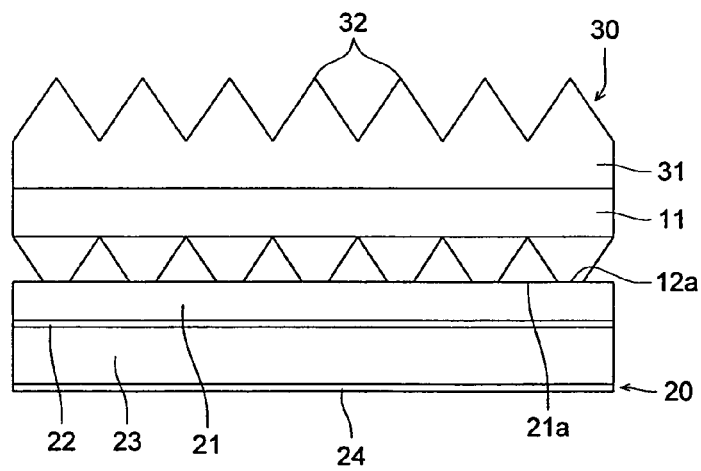
FIG. 11 is an outline side view diagram showing the surface light emitter according to the above fourth preferred embodiment.

Further, in the surface light emitter according to this fourth preferred embodiment, as is shown in FIG. 11, similar to the case of the above first preferred embodiment, the tip surfaces 12a of the projections 12 with a truncated square pyramid shape in the above prism array sheet 10A are adhered to the light emitting side surface 21a of the transparent substrate 21 that emits the light emitted by the surface light emitting device 20, and on the light emitting side surface 14 of this prism array sheet 10A, opposite to the surface in which the projections 12 are provided, the transparent substrate 31 of the second prism array sheet 30 is placed so that the projections 32 provided on said second prism array sheet 30 are placed on the top surface on the opposite side.

Further, in providing in this manner the transparent substrate 31 of the second prism array sheet 30 above, the light emitting side surface 14 of the prism array sheet 10A, apart from the method of adhering the transparent substrate 31 of the second prism array sheet 30 on to the light emitting side surface 14 of the above prism array sheet 10A, it is possible to use the method of merely placing the second prism array sheet 30 on top of the light emitting side surface 14 of the above prism array sheet 10A so that there is a very small gap between it and the above prism array sheet 10A.

Further, if the second prism array sheet 30 is provided on top of the light emitting side surface 14 of the prism array sheet 10A on the side opposite to the projections 12 that are adhered to the light emitting side surface 21a of the surface light emitting device 20 as above so that the projections 32 provided on said second prism array sheet 30 are placed on the top surface on the opposite side, the light emitted at an angle from the light emitting side surface 14 of the above prism array sheet 10A is refracted by the above projections 32 in the second prism array sheet 30 and is converged towards the front, and hence the front luminance of the light emitted via this second prism array sheet 30 gets enhanced.

Further, in this fourth preferred embodiment, although a transparent sheet 31 on side of which are formed triangular pillar shaped projections 32 successively is used as the second prism array sheet 30, the shape of the projections or depressions formed on one side of the transparent substrate 31 need not be restricted to this, and although not shown in the figure, it is possible to form projections or depressions of various shapes such as pyramid, circular cone, truncated pyramid, circular truncated cone, etc.

Figure 12:
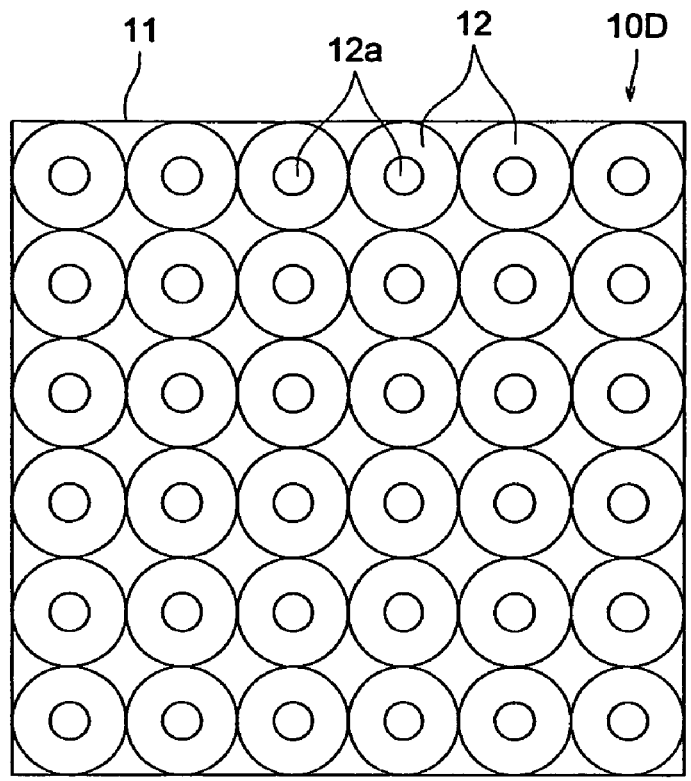
FIG. 12(A) shows a plan view diagram and the side view diagram of the surface on the side opposite to the light emitting side surface of the light control sheet used in the surface light emitter according to the fifth preferred embodiment of the present invention.
FIG. 12(B) is a side view diagram of the light control sheet used in the surface light emitter according to the fifth preferred embodiment of the present invention.
Figure 12:
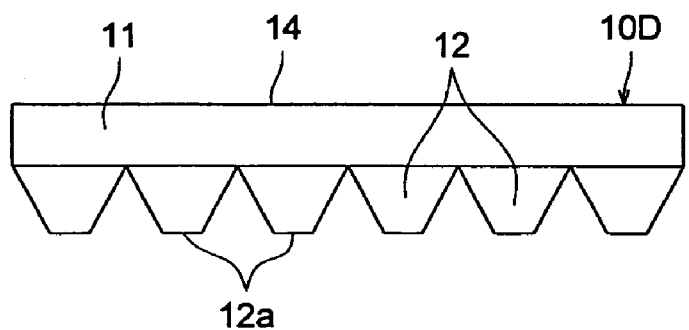

Preferred Embodiment 5:

In the fifth preferred embodiment, as is shown in FIG. 12(A) and FIG. 12(B), as the sheet light control sheet, a prism array sheet 10D that has a transparent substrate 11 is used, the transparent substrate 11 on one side of which circular truncated cone shaped projections 12 shrunk towards the tip side are formed so as to touch each other successively in the lateral and longitudinal directions.

Figure 13:
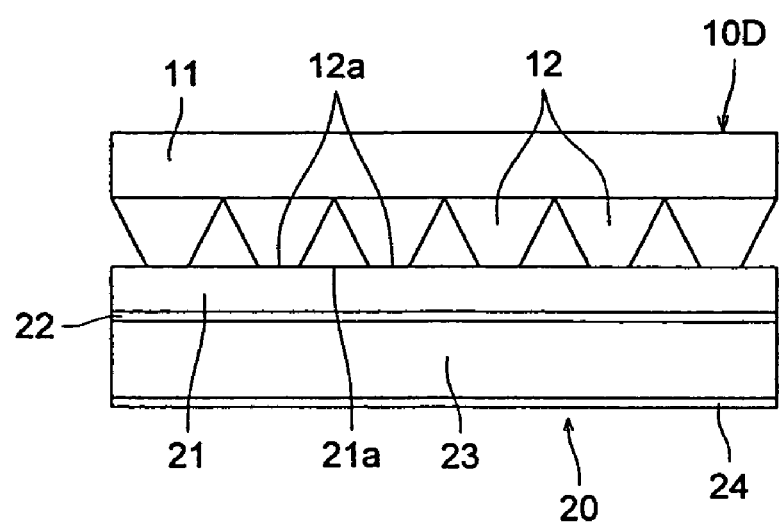
FIG. 13 is an outline side view diagram showing the surface light emitter according to the above fifth preferred embodiment.

Further, in the surface light emitter according to this fifth preferred embodiment, as is shown in FIG. 13, similar to the case of the above first preferred embodiment, the tip surfaces 12a of the projections 12 with a circular truncated cone shape in the above prism array sheet 10D are adhered to the light emitting side surface 21a of the transparent substrate 21 that emits the light emitted by the surface light emitting device 20.

Further, as is shown in this fifth preferred embodiment, by providing circular truncated cone shaped projections 12 in the prism array sheet 10D, the front luminance of the light emitted via this prism array sheet 10D gets further enhanced by a large amount. Although the detailed cause of this is not clear, according to the investigations made by the present inventors. For example, when the projections 12 have a truncated square pyramid shape described in the first preferred embodiment, since the apex angle between the ridge lines in the cross-sectional plane in the direction of the ridge lines becomes smaller than the apex angle in the cross-sectional plane in the direction of arrangement of the truncated square pyramid shaped projections 12, there will be emitted light that cannot sufficiently contribute to improvement in the front luminance. But in the case of circular truncated cone shaped projections 12 as in this fifth preferred embodiment, since the apex angle is constant in cross-sectional planes in any direction, it is considered that there is no light that cannot sufficiently contribute to the improvement in the front luminance that was present in the case of the square truncated pyramid shaped projections 12.

Figure 14:
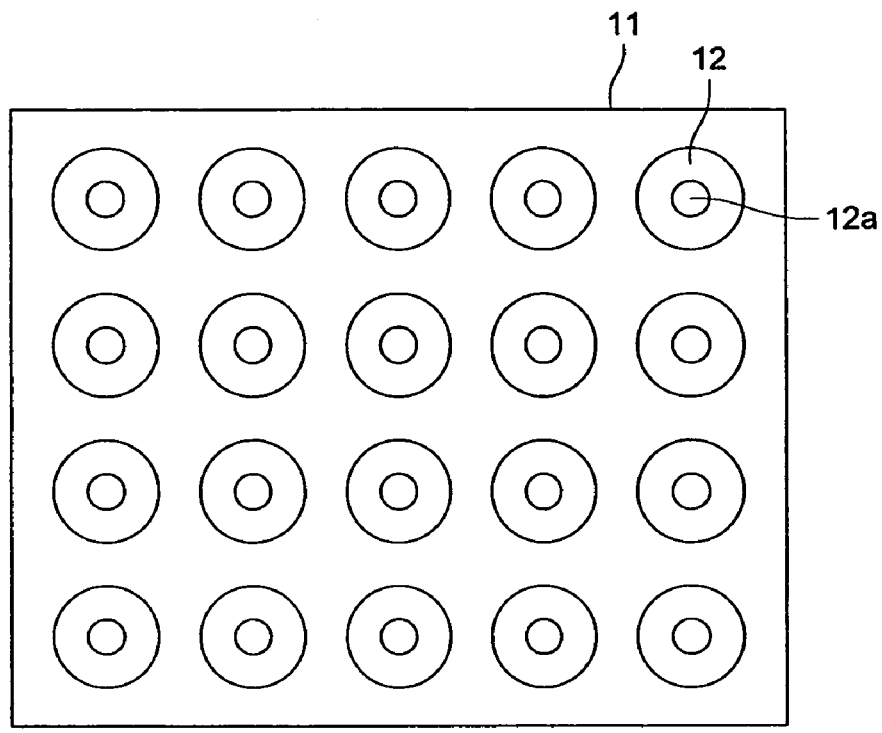
FIG. 14(A) shows a plan view diagram and the side view diagram of the surface on the side opposite to the light emitting side surface of the light control sheet used in the surface light emitter according to the fifth preferred embodiment.
FIG. 14(B) is a side view diagram showing a modified example of the light control sheet used in the surface light emitter according to the above fifth preferred embodiment.
Figure 14:
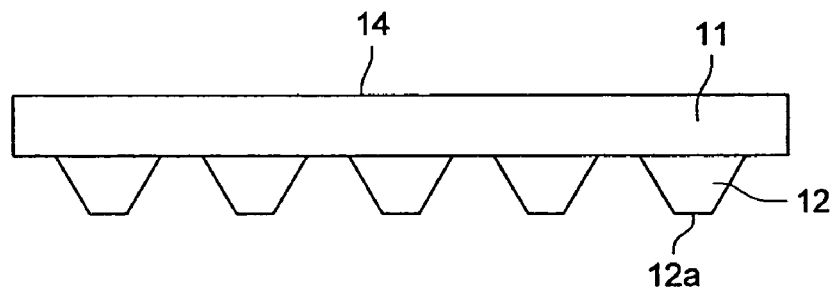

Further, in the surface light emitter according to this fifth preferred embodiment, although the above circular truncated cone shaped projections 12 were provided on one surface of the transparent substrate 11 so that they touch each other, it is also possible to provide the circular truncated cone shaped projections 12 with prescribed spacings in the lateral and longitudinal directions as is shown in FIG. 14(A) and FIG. 14(B).

Figure 15:
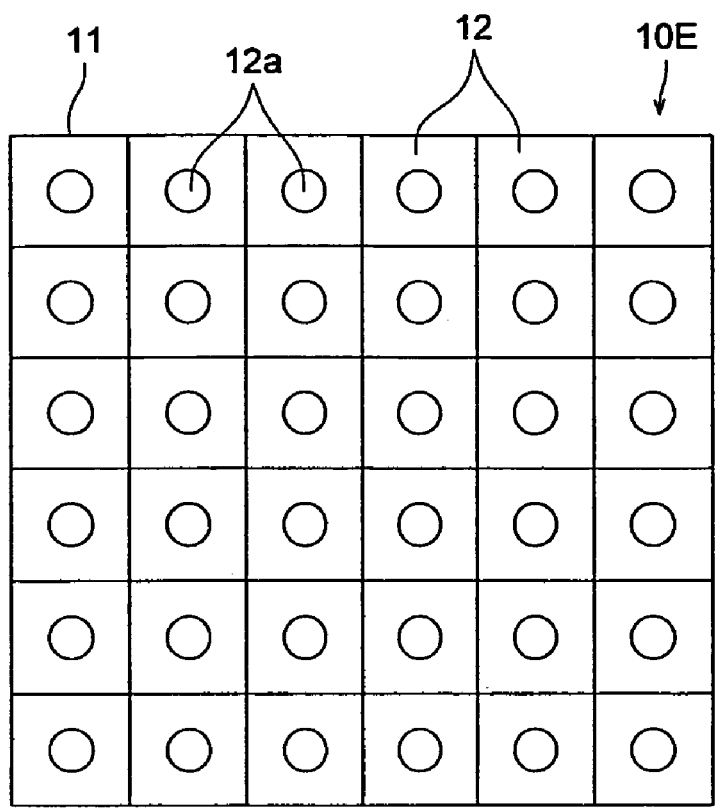
FIG. 15(A) shows a plan view diagram and the side view diagram of the surface on the side opposite to the light emitting side surface of the light control sheet used in the surface light emitter according to the sixth preferred embodiment of the present invention.
FIG. 15(B) is a side view diagram of the light control sheet used in the surface light emitter according to the above sixth preferred embodiment.
Figure 15:
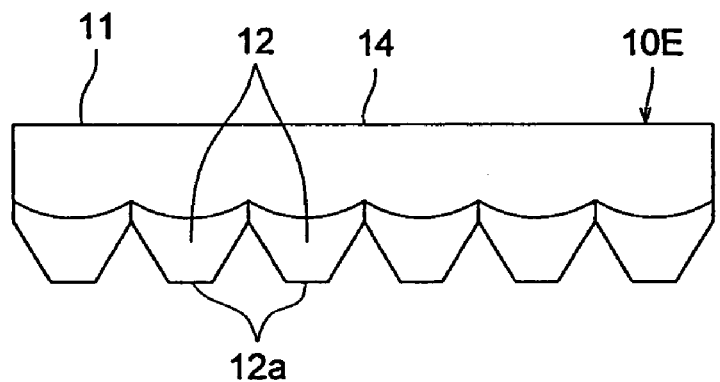

Preferred Embodiment 6:

In the sixth preferred embodiment, as is shown in FIG. 15(A) and FIG. 15(B), as the light control sheet, a prism array sheet 10E which has a transparent substrate 11 is used, the transparent substrate 11 on one surface of which are formed circular truncated cone shaped projections 12 with shrunk tips and whose periphery is cut to a square shape and which projections are formed successively in the lateral and longitudinal directions.

Figure 16:
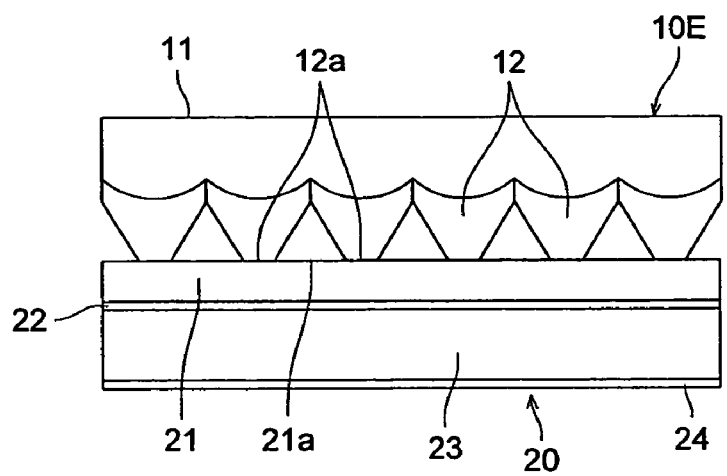
FIG. 16 is an outline side view diagram showing the surface light emitter according to the above sixth preferred embodiment.

Further, in the surface light emitter according to this sixth preferred embodiment, as is shown in FIG. 16, similar to the case of the above first preferred embodiment, the tip surfaces 12a of the projections 12 with a circular truncated cone shape in the above prism array sheet 10E are adhered to the light emitting side surface 21a of the transparent substrate 21 that emits the light emitted by the surface light emitting device 20.

Figure 17:
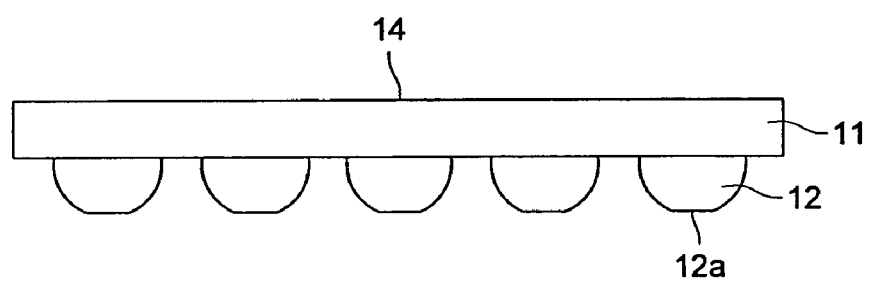
FIG. 17 is a side view diagram showing a first modified example of the light control sheet in which the projection part provided on the surface opposite to the light emitting side surface is modified in the above preferred embodiments 1 to 6.
Figure 18:
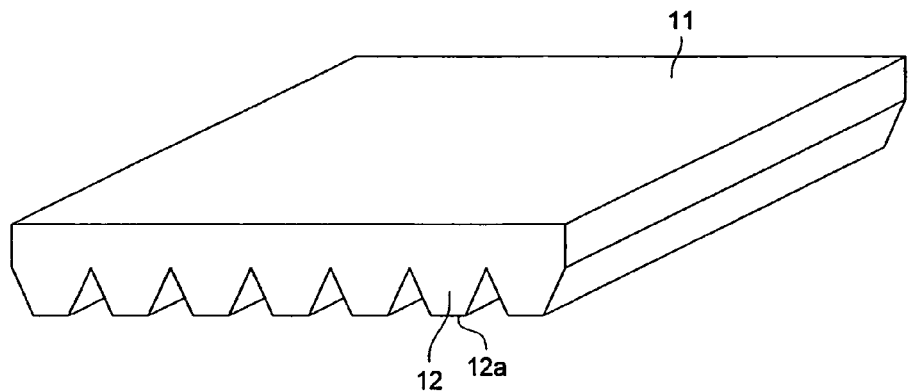
FIG. 18 is a side view diagram showing a second modified example of the light control sheet in which the projection part provided on the surface opposite to the light emitting side surface is modified in the above preferred embodiments 1 to 6.

Further, in the above first to sixth preferred embodiments, although square truncated pyramid shaped projections 12 with shrunk tips or circular truncated cone shaped projections 12 with shrunk tips were formed on one surface of the transparent substrate 11 in the prism array sheets 10A to 10E, the projections 12 formed on one side of the transparent substrate 11 need not be limited to these, it is sufficient if the shape is shrunk towards the light emitting side surface 21a of the surface light emitting device 20, and it is possible to provide projections 12 that are hemispheres whose tips are made flat as shown in FIG. 17, or to provide projections 12 that have trapezoidal pillar shapes with shrunk tips as shown in FIG. 18.

Figure 19:
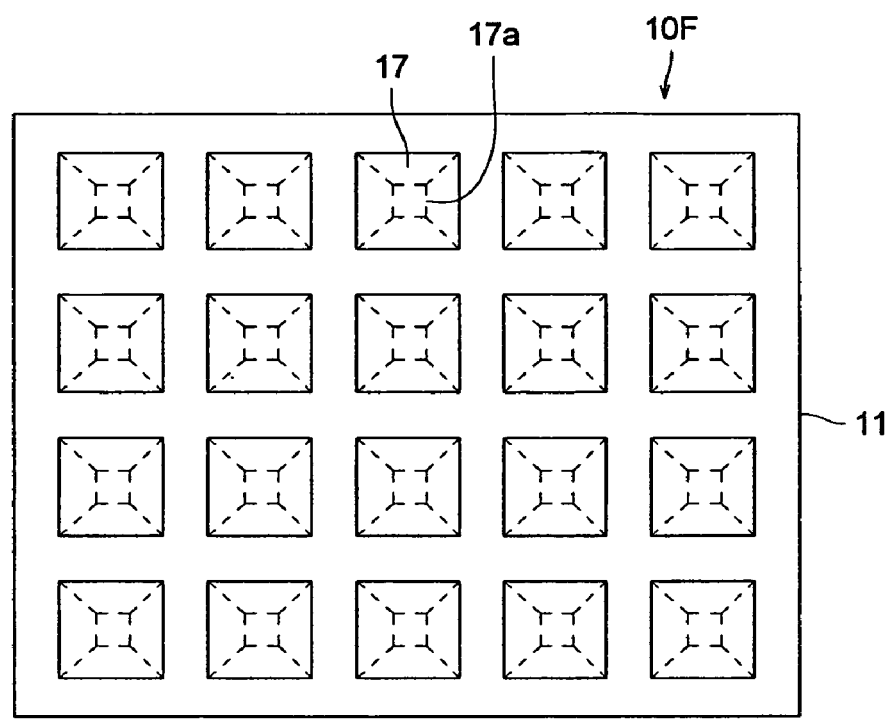
FIG. 19(A) shows a plan view diagram and the side view diagram of the surface on the side opposite to the light emitting side surface of the light control sheet used in the surface light emitter according to the seventh preferred embodiment of the present invention.
FIG. 19(B) is a side view diagram of the light control sheet used in the surface light emitter according to the above seventh preferred embodiment of the present invention.
Figure 19:
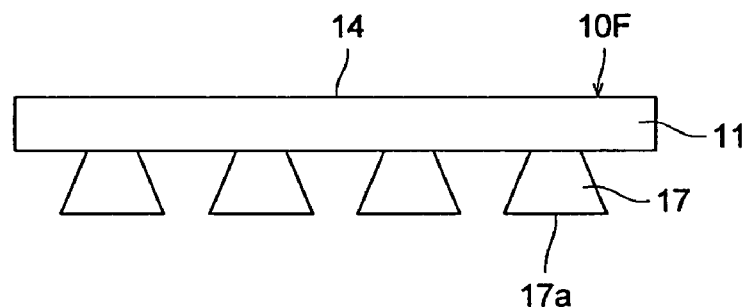

Preferred Embodiment 7:

In the seventh preferred embodiment, as is shown in FIG. 19(A) and FIG. 19(B), as the light control sheet, a prism array sheet 10F which has a transparent substrate 11 is used, the transparent substrate 11 on one surface of which a plurality of truncated square pyramid shaped projections 17 with enlarged tips are formed successively in the lateral and longitudinal directions. Further, in the present patent specification, enlargement of the tips of the projections means that projections are formed that become bigger as the distance from the prism array sheet increases, and in the example of FIG. 19(B), this means that the shape is one in which the size increases towards the bottom.

Figure 20:
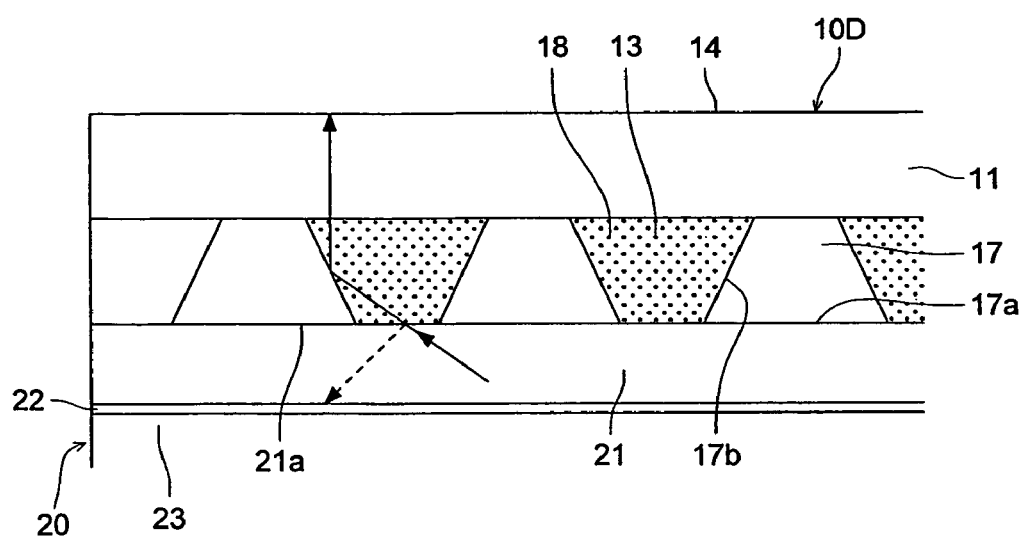
FIG. 20 is an explanatory diagram showing a partially enlarged view of the surface light emitter according to the above seventh preferred embodiment.

Further, in the surface light emitter according to this seventh preferred embodiment, as is shown in FIG. 20, similar to the case of the above first preferred embodiment, not only that the enlarged tip surfaces 17*a* of the projections 17 with a truncated square pyramid shape in the above prism array sheet 10F are adhered to the light emitting side surface 21*a* of the transparent substrate 21 that emits the light emitted by the surface light emitting device 20, but also a transparent material 18 with a higher refractive index than that of the prism array sheet 10F is packed in the space part 13 between these projections 17. Further, it is possible to use for example emulsion oil etc. as a transparent material 18 with such a high refractive index.

Further, in the surface light emitter according to the seventh preferred embodiment, when light is emitted from the above surface light emitting device 20, at the light emitting side surface 21*a* of the surface light emitting device 20 where there is contact with the space part 13 in which the transparent material 18 with a higher refractive index than that of the prism array sheet 10F is packed, the light that would get totally reflected at the light emitting side surface 21*a* of the surface light emitting device 20 if the light control sheet were not provided does not get totally reflected, but is guided into the interior of the space part 13 in which the transparent material 18 with a higher refractive index is packed.

Further, most of the light that is guided into the interior of the space part 13 in which the transparent material 18 with a higher refractive index is packed is reflected at the inclined surface 17*b* of the projections 17 which surface is the boundary with the projections 17 provided so as to get large towards the space part 13 filled with the transparent material 18 with a high refractive index and the above light emitting side surface 21*a* of the surface light emitting device 20, and this reflected light is guided from the space part 13 filled with the transparent material 18 with a high refractive index to the light emitting side surface 14 of the prism array sheet 10F and is emitted from there to the outside.

Figure 21:
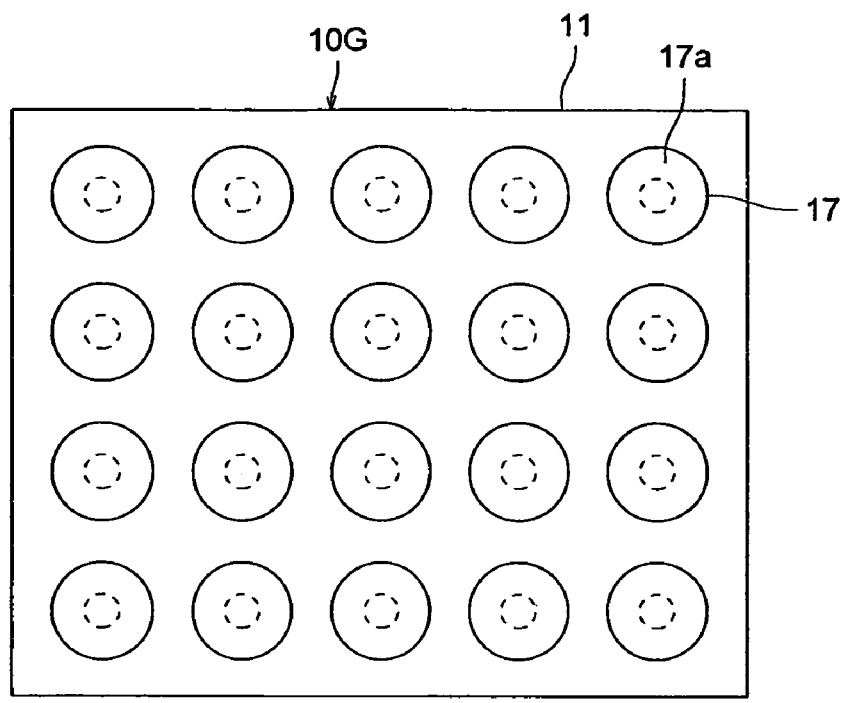
FIG. 21(A) shows a plan view diagram and the side view diagram of the surface on the side opposite to the light emitting side surface of the light control sheet used in the surface light emitter according to the eighth preferred embodiment of the present invention.
FIG. 21(B) is a side view diagram of the light control sheet used in the surface light emitter according to the above eighth preferred embodiment of the present invention.
Figure 21:
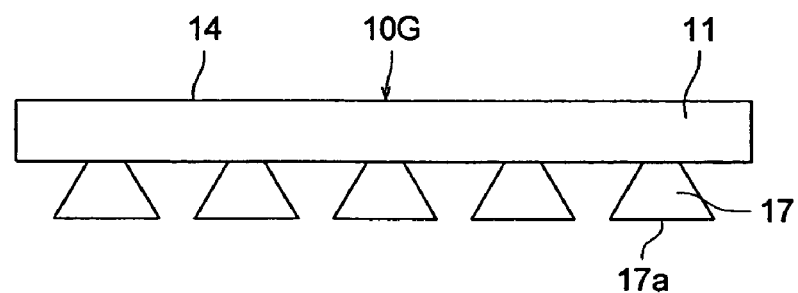

Preferred Embodiment 8:

In the eighth preferred embodiment, as is shown in FIG. 21(A) and FIG. 21(B), as the light control sheet, a prism array sheet 10G which has a transparent substrate 11 is used, the transparent substrate 11 on one surface of which a plurality of circular truncated cone shaped projections 17 with enlarged tips are formed successively in the lateral and longitudinal directions.

Further, in the surface light emitter according to this eighth preferred embodiment, similar to the case of the above seventh preferred embodiment, not only that the enlarged tip surfaces 17*a* of the projections 17 with a circular truncated cone shape in the above prism array sheet 10G are adhered to the light emitting side surface 21*a* of the transparent substrate 21 that emits the light emitted by the surface light emitting device 20, but also a transparent material 18 with a higher refractive index than that of the prism array sheet 10F is packed in the space part 13 between these projections 17.

Further, in the surface light emitter according to the eighth preferred embodiment, when light is emitted from the above surface light emitting device 20, similar to the case of the above seventh preferred embodiment, at the light emitting side surface 21*a* of the surface light emitting device 20 where there is contact with the space part 13 in which the transparent material 18 with a higher refractive index than that of the prism array sheet 10G is packed, the light that would get totally reflected at the light emitting side surface 21*a* of the surface light emitting device 20 if the light control sheet is not provided does not get totally reflected, but is guided into the interior of the space part 13 in which the transparent material 18 with a higher refractive index is packed.

Further, most of the light that is guided into the interior of the space part 13 in which the transparent material 18 with a higher refractive index is packed is reflected at the inclined surface 17*b* of the projections 17 which surface is the boundary with the projections 17 provided so as to get large towards the space part 13 filled with the transparent material 18 with a high refractive index and the above light emitting side surface 21*a* of the surface light emitting device 20, and this reflected light is guided from the space part 13 filled with the transparent material 18 with a high refractive index to the light emitting side surface 14 of the prism array sheet 10F and is emitted from there to the outside.

In addition, in the surface light emitters according to both the above seventh preferred embodiment and eighth preferred embodiment, although not shown in the figure, it is possible to provide a concavoconvex structure in the light emitting side surface 14 on the surface opposite to the surface on which the above projections 17 with enlarged tips are formed, and also the shape of the projections 17 provided on one surface of the above transparent substrate 11 need not be restricted to those described above, but can be any shape that gets large towards the light emitting side surface 21*a* of the surface light emitting device 20.

Further, in the surface light emitters according to each of the above first to eighth preferred embodiments, if the surface light emitting device 20 has a periodic structure, in order to prevent luminance fluctuations due the generation of moire fringes, it is desirable that the pitch of the projections 12, 17 in each of the above prism array sheets 10A to 10G is made greater than 1.2 times or less than 0.8 times the pitch of the periodic structure of the surface light emitting devices 20, or to make random the pitch of the projections 12, 17 in each of the above prism array sheets 10A to 10G, or to make the orientation of arrangement of the projections 12, 17 be at an angle to the orientation of the periodic structure of the surface light emitting devices 20.

Figure 22:
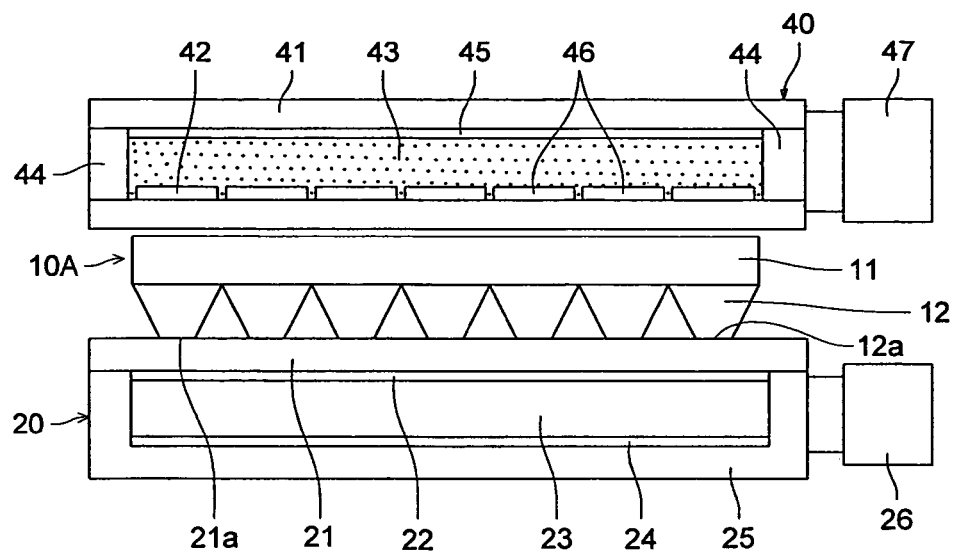
FIG. 22 is an explanatory diagram of the outline cross-sectional view of the display apparatus according to the ninth preferred embodiment of the present invention.

Preferred Embodiment 9:

The ninth preferred embodiment shows the form of implementation of a display apparatus, and this display apparatus, as is shown in FIG. 22, has the configuration of a display device 40 employing a surface light emitter according to the above first preferred embodiment and a liquid crystal display device 43, wherein the above surface light emitter is used as a back light for the LCD.

Here, in this ninth preferred embodiment, the organic EL layer 23 in the above surface light emitter is being protected by a sealing material 25.

Further, in the above display device 40, a liquid crystal 43 is packed between a pair of transparent substrates 41 and 42 and not only that the periphery is sealed by a sealing material 44, but also on the opposing surfaces of the above pair of transparent substrates 41 and 42, a continuous large transparent electrode 45 is provided on the one hand on the transparent substrate 41, while on the other transparent substrate 42 individual transparent electrodes 46 are provided separating them in correspondence with the pixels.

In addition, in the display apparatus according to this ninth preferred embodiment, an electric field is applied from the power supply circuit 26 for light generation to the transparent electrode 22 and its opposing electrode 24 provided in the surface light emitting device 20 in the above surface light emitter thereby causing the surface light emitting device 20 to emit light, and the light emitted from the light emitting side surface 21a of this surface light emitting device 20 is passed through the above prism array sheet 10A and is guided to the above display device 40.

Further, in the display device 40 to which the light is guided via the above prism array sheet 10A, the individual electrode 46 at some appropriate location is driven using the drive circuit 47 for display devices, and the image is displayed by carrying out switching in units of a pixel.

Further, in the display apparatus of this ninth preferred embodiment, because the light emitted from the light emitting side surface 21a of the surface light emitting device 20 is guided to the above display device 40 after passing through the above prism array sheet 10A, light with a high front luminance is guided into the display device 40, and hence very bright and good image will be displayed.

Figure 23:
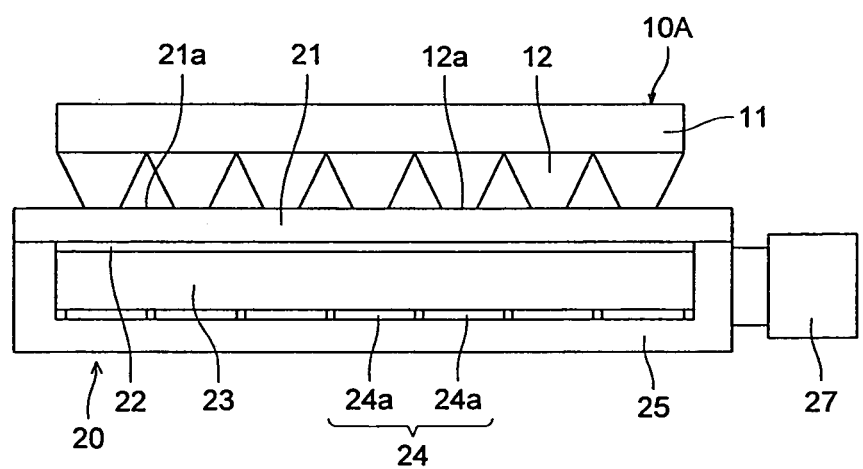
FIG. 23 is an explanatory diagram of the outline cross-sectional view of the display apparatus according to the tenth preferred embodiment of the present invention.

Preferred Embodiment 10:

The tenth preferred embodiment shows another form of implementation of a display apparatus, and in this display apparatus, as is shown in FIG. 23, in the surface light emitter of said first preferred embodiment, not only the organic EL layer 23 in the above surface light emitting device 20 is protected by the sealing material 25, but also the individual electrodes 24a separated for each pixel are provided as the opposing electrodes for the transparent electrode 22 with the organic EL layer 23 in between them.

Further, in the display apparatus of this tenth preferred embodiment, an electric field is applied from the power supply circuit 27 for light generation to the transparent electrode 22 and its opposing electrodes 24a at appropriate positions provided in the surface light emitting device 20 thereby causing the surface light emitting device 20 to emit light in units of a pixel, and the light emitted in units of a pixel is guided from the light emitting side surface 21a to the above prism array sheet 10A thereby displaying the image.

Here, in the display apparatus of this tenth preferred embodiment, since the display is being made by passing the light emitted in units of a pixel in the above manner from the light emitting side surface 21a of the surface light emitting device 20 through the above prism array sheet 10A, very bright and good image can be displayed.

Further, in the display apparatus of this tenth preferred embodiment, the pitch of the pixels in the above surface light emitting device 20 is made almost identical to the pitch of the projections 12 in the above prism array sheet 10A, thereby making the positions of the projections in the prism array sheet 10A become identical with the pixel positions.

Further, the display apparatus of this tenth preferred embodiment is suitable for applications with relatively large pixel sizes such as the large screen displays installed in public places, etc.

IMPLEMENTATION EXAMPLES

Next, the surface light emitters according to some implementation examples of the present invention are compared with some comparison examples, and it is made clear that the front luminance of the light emitted from the surface light emitter is improved greatly in the case of the surface light emitters of the implementation examples according to the present invention.

Comparison Example 1

Figure 24:
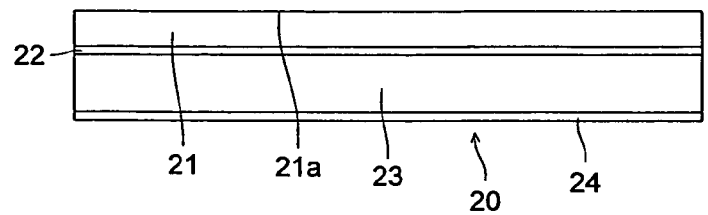
FIG. 24 is a side view diagram of the surface light emitter according to the comparison example 1.

In the comparison example 1, as is shown in FIG. 24, a surface light emitting device 20 was used as it is as the surface light emitter.

Further, the surface light emitting device 20 used had an organic EL device provided with an organic EL layer 23 and an opposing electrode 24 provided on the surface of a transparent substrate 21 provided with a transparent electrode as described above.

Further, in this surface light emitting device 20, an alkali-free glass of size 40 mm×52 mm and thickness 0.7 mm was used as the above transparent substrate 21, and on one surface of this transparent substrate 21 an ITO film of 150 nm thickness was formed as the transparent electrode 22, patterning of the electrode shape was done using photolithography with a size of 35 mm×46 mm. Further, the resistance of this transparent electrode was measured using a Loresta resistivity meter (manufactured by Mitsubishi Chemical) and was found to be 20 $\Omega/\square$.

Further, on top of this transparent electrode 22, using triazole derivative as the hole transporting material a hole transporting layer with a film thickness of 100 nm was formed using the vacuum deposition method. Next, on top of this hole transporting layer, a light emitting layer with a film thickness of 100 nm was formed by depositing luminescent material having tris (8-quinolinolat) using the vacuum deposition method. Next, on top of this light emitting layer, a hole blocking layer with a film thickness of 100 nm was formed by depositing triazine derivative using the vacuum deposition method. In addition, on top of this hole blocking layer, an electron transporting layer with a film thickness of 100 nm was formed by depositing nitro-substituted fluorene derivative using the vacuum deposition method. Next, on top of this electron transporting layer the opposing electrode 24 was formed by depositing a 100 nm thick film of aluminum using the sputtering method. Further, the transparent substrate 21 on the light emitting side 21a of this light emitting device 20 had a refractive index of 1.517 for light of wavelength 550 nm.

Comparison Example 2

Figure 25:
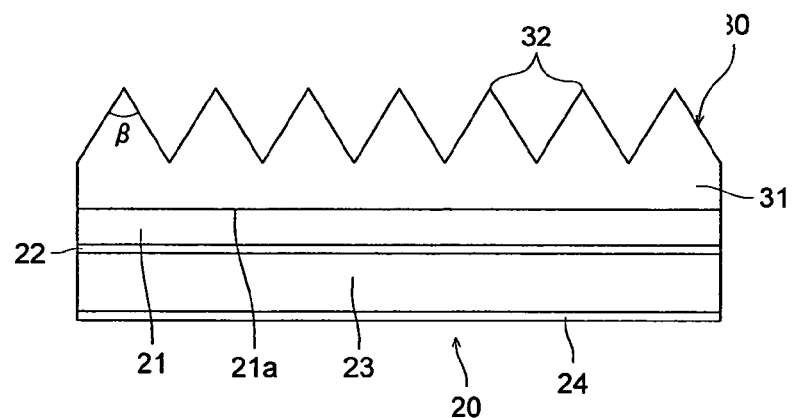
FIG. 25 is a side view diagram of the surface light emitter according to the comparison example 2.

In the second comparison example, similar to the second prism array sheet 30 used in the surface light emitter of said fourth preferred embodiment, a prism array sheet 30 with triangular pillar shaped projections 32 formed on one side of a transparent substrate 31 is used, as is shown in FIG. 25, and this prism array sheet 30 is adhered to the light emitting side surface 21a of the surface light emitting device 20 of the above comparison example 1 so that the triangular pillar shaped projections 32 in this prism array sheet 30 are on the side opposite to the light emitting side surface 21a of the surface light emitting device 20. Further, the refractive index of this prism array sheet 30 was 1.495 for light of wavelength 550 nm, the apex angle β of the triangular pillar shaped projections 32 was 90°, and if the pitch of the above triangular pillar shaped projections 32 is taken as 1, then the thickness of the above transparent substrate 31 was 2.6 and the pitch of the projections 32 was 100 μm.

Implementation Example 1

In the first implementation example, as was shown in the first preferred embodiment, a prism array sheet 10A was used which was a transparent substrate 11 on one surface of which truncated square pyramid shaped projections with shrunk tips were formed successively, and the tip surfaces 12a of the truncated square pyramid shaped projections 12 in this prism array sheet 10A are adhered to the light emitting side surface 21a of the surface light emitting device 20 of the comparison example 1. Further, the refractive index of this prism array sheet 10A was 1.495 for light of wavelength 550 nm, the apex angle θ of the truncated square pyramid shaped projections 12 was 60°, and if the pitch of the above truncated square pyramid shaped projections 12 is taken as 1, then the thickness of the above transparent substrate 11 was 2.6, the height of the truncated square pyramid shaped projections 12 was 0.45, and the pitch of the projections 12 was 100 μm.

Implementation Example 2

In the second implementation example, as was shown in the second preferred embodiment, a prism array sheet 10B was used which was a transparent substrate 11 on one surface of which a plurality of truncated square pyramid shaped projections with shrunk tips were formed successively with respective prescribed spacings in the lateral and longitudinal directions, and the tip surfaces 12a of the truncated square pyramid shaped projections 12 in this prism array sheet 10A are adhered to the light emitting side surface 21a of the surface light emitting device 20 of the comparison example 1. Further, the refractive index of this prism array sheet 10B was 1.495 for light of wavelength 550 nm, the apex angle θ of the truncated square pyramid shaped projections 12 was 60°, and if the pitch of the above truncated square pyramid shaped projections 12 is taken as 1, then the thickness of the above transparent substrate 11 was 2.6, the height of the truncated square pyramid shaped projections 12 was 0.45, the width of the flat surface 12c between the truncated square pyramid shaped projections 12 was 0.2, and the pitch of the projections 12 was 100 μm.

Implementation Example 3

In the third implementation example, as was shown in the third preferred embodiment, a prism array sheet 10C was used which was a transparent substrate 11 not only on one surface of which truncated square pyramid shaped projections with shrunk tips were formed successively in the lateral and longitudinal directions, but also square pyramid shaped depressions 15 were provided on the light emitting side surface on the opposite side so as to correspond to the above truncated square pyramid shaped projections 12, and the tip surfaces 12a of the truncated square pyramid shaped projections 12 in this prism array sheet 10C are adhered to the light emitting side surface 21a of the surface light emitting device 20 of the comparison example 1. Further, the refractive index of this prism array sheet 10C was 1.495 for light of wavelength 550 nm, the apex angle θ of the truncated square pyramid shaped projections 12 was 60°, the apex angle of the square pyramid shaped depressions 15 was 90°, and if the pitch of the above truncated square pyramid shaped projections 12 is taken as 1, then the thickness of the above transparent substrate 11 was 2.6, the height of the truncated square pyramid shaped projections 12 was 0.45, the depth of the square pyramid shaped depressions 15 was 0.5, and the pitch of the projections 12 was 100 μm.

Further, the surface light emitting devices in each of the above comparison examples 1 and 2 and in the implementation examples 1 to 3 were made to emit light, and not only the light emission distribution characteristics were determined for the respective surface light emitter, but also the front luminance was obtained for each of the surface light emitters when the front luminance of the surface light emitter of the above comparison example 1 was taken as 1. In addition, the light distribution characteristics were measured using an angle versus brightness measuring instrument taking the normal line to the surface light emitter as 0°, by measuring the brightness in a direction at a specific angle to the normal line within a plane containing the normal line while changing the angle. Here, the relative brightness is obtained taking as 1 the front luminance in the case of the comparison example 1 in which the prism array sheet is not used, and the value of the maximum brightness within a range of front direction ±15° is taken as the front luminance, and these values were indicated in the different figures.

Figure 26:
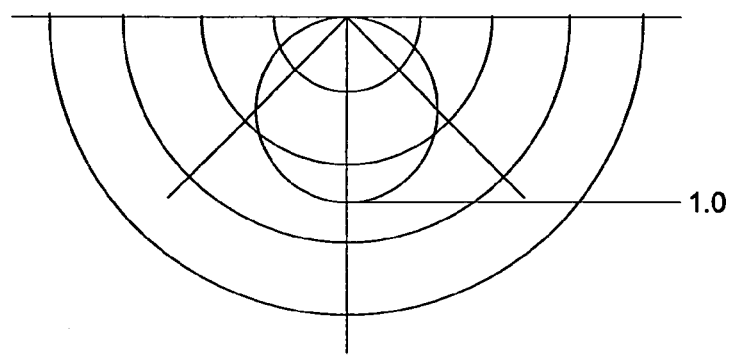
FIG. 26 is a diagram showing the light distribution characteristics of the surface light emitter of the comparison example 1.
Figure 27:
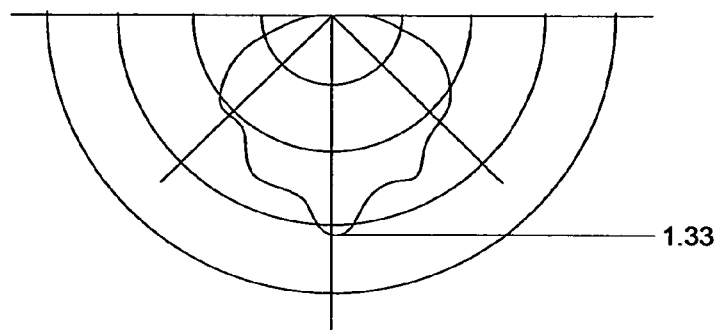
FIG. 27 is a diagram showing the light distribution characteristics of the surface light emitter of the comparison example 2.
Figure 28:
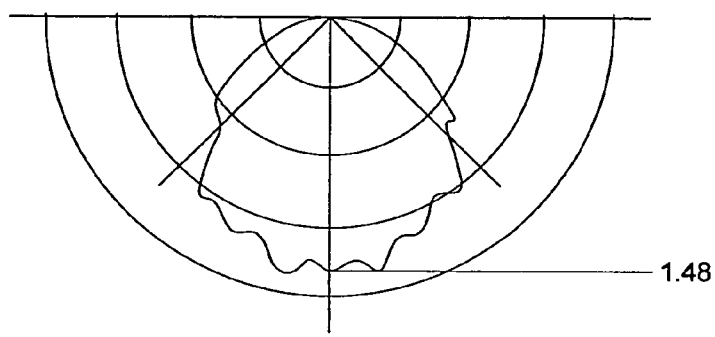
FIG. 28 is a diagram showing the light distribution characteristics of the surface light emitter of the implementation example 1.
Figure 29:
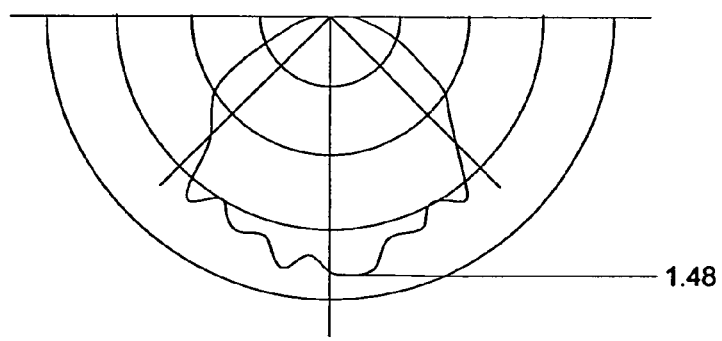
FIG. 29 is a diagram showing the light distribution characteristics of the surface light emitter of the implementation example 2.
Figure 30:
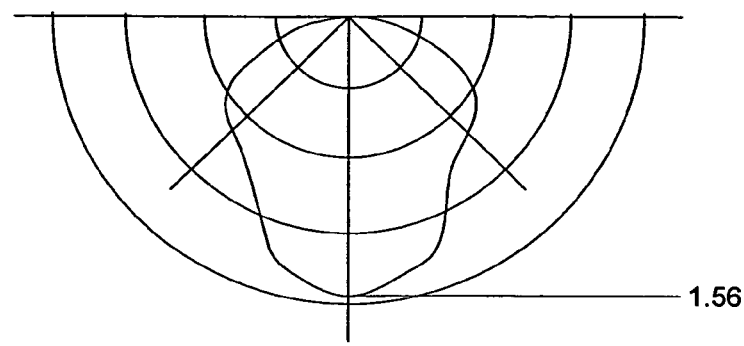
FIG. 30 is a diagram showing the light distribution characteristics of the surface light emitter of the implementation example 3.

Further, the result for the comparison example 1 is shown in FIG. 26, the result for the comparison example 2 is shown in FIG. 27, the result for the implementation example 1 is shown in FIG. 28, the result for the implementation example 2 is shown in FIG. 29, and the result for the implementation example 3 is shown in FIG. 30. Further, in the case of the surface light emitter of comparison example 2, in the prism array sheet 30 in which triangular pillar shaped projections 32 are provided on one surface of the transparent substrate 31, the light distribution characteristics is shown in the direction in which the triangular pillar shaped projections 32 are arranged.

From these results, the front luminance in each of the surface light emitters of the implementation examples 1 to 3 has been greatly improved over the front luminance in the surface light emitters of the comparison examples 1 and 2. In addition, similar results were obtained even when similar measurements were made after changing the pitch of the projections 12 in the above implementation examples 1 to 3 and the pitch p of the above projections 31 in the comparison example 2 respectively to 30 μm, 50 μm, 200 μm, and 300 μm.

Comparison Example 3

In the comparison example 3, similar to the comparison example 1 above, the surface light emitting device 20 shown in FIG. 24 is used as it is as the surface light emitter. Further, the transparent substrate 21 on the side of the light emitting side surface 21a of this surface light emitting device 20 had a refractive index of 1.5185 at a light wavelength of 550 nm.

Comparison Example 4

In the comparison example 4, similar to the comparison example 2 above, a prism array sheet 30 is used which is a transparent substrate 31 on one surface of which triangular pillar shaped projections 32 are formed successively, and this prism array sheet 30 is adhered to the light emitting side surface 21a of the surface light emitting device 20 of the above comparison example 3 with the triangular pillar shaped projections 32 in this prism array sheet 30 being on the side opposite to the light emitting side surface 21a of the surface light emitting device 20 of the above comparison example 3. Further, the prism array sheet 30 had a refractive index of 1.493 at a light wavelength of 550 nm, the apex angle β of the triangular pillar shaped projections 32 was 90°, the pitch p of the above triangular pillar shaped projections 32 was 50 μm, and the height of the projections 32 was 25 μm.

Implementation Examples 4 to 9

In the implementation examples 4 to 9, as was shown in the first preferred embodiment, a prism array sheet 10A was used which was a transparent substrate 11 on one surface of which truncated square pyramid shaped projections with shrunk tips were formed successively in the lateral and longitudinal directions, and the tip surfaces 12a of the truncated square pyramid shaped projections 12 in this prism array sheet 10A are adhered to the light emitting side surface 21a of the surface light emitting device 20 of the comparison example 3.

Further, the above prism array sheet 10A used in all the implementation examples 4 to 9 were not only those with a refractive index of 1.493 for a light wavelength of 550 nm, a pitch p of 50 μm of the above truncated square pyramid shaped projections 12, but also the apex angle θ of the above truncated square pyramid shaped projections 12 and the height h of the projections 12 were changed.

Further, as is shown in Table 1 below, in the implementation example 4 the apex angle θ of the above truncated square pyramid shaped projections 12 was 50° and the height h was 22 μm, in the implementation example 5 the apex angle θ of the above truncated square pyramid shaped projections 12 was 50° and the height h was 17 μm, in the implementation example 6 the apex angle θ of the above truncated square pyramid shaped projections 12 was 50° and the height h was 7 μm, in the implementation example 7 the apex angle θ of the above truncated square pyramid shaped projections 12 was 50° and the height h was 37 μm, in the implementation example 8 the apex angle θ of the above truncated square pyramid shaped projections 12 was 40° and the height h was 22 μm, and in the implementation example 9 the apex angle θ of the above truncated square pyramid shaped projections 12 was 56° and the height h was 17 μm.

one surface of which are provided triangular pillar shaped projections is used, similar to the above comparison example 4, a prism array sheet 30 with a refractive index of 1.493 at a light wavelength of 550 nm, an apex angle β of the triangular pillar shaped projections 32 of 90°, a pitch p of the above triangular pillar shaped projections 32 of 50 μm, and a height of the projections 32 of 25 μm.

Further, as the above prism array sheet 10A, similar to the above implementation examples 4 to 9, a prism array sheet was used with a refractive index of 1.493 for a light wavelength of 550 nm, a pitch p of 50 μm of the above truncated square pyramid shaped projections 12, and also the apex angle θ of the above truncated square pyramid shaped projections 12 and the height h of the projections 12 were changed.

Further, as is shown in Table 2 below, in the implementation example 10 the apex angle θ of the above truncated square pyramid shaped projections 12 was 60° and the height h was 22 μm, in the implementation example 11 the apex angle θ of the above truncated square pyramid shaped projections 12 was 60° and the height h was 17 μm, in the implementation example 12 the apex angle θ of the above truncated square pyramid shaped projections 12 was 60° and the height h was 7 μm, in the implementation example 13 the apex angle θ of the above truncated square pyramid shaped

TABLE 1

| | | Projection part | | | | | |
|---|---|---|---|---|---|---|---|
| | Refractive index (n) | p (μm) | h (μm) | θ (°) | 1/n − 0.35 | sin θ | 1/n + 0.3 |
| Implementation example 4 | 1.493 | 50 | 22 | 50 | 0.3198 | 0.7660 | 0.9698 |
| Implementation example 5 | 1.493 | 50 | 17 | 50 | 0.3198 | 0.7660 | 0.9698 |
| Implementation example 6 | 1.493 | 50 | 7 | 50 | 0.3198 | 0.7660 | 0.9698 |
| Implementation example 7 | 1.493 | 50 | 37 | 50 | 0.3198 | 0.7660 | 0.9698 |
| Implementation example 8 | 1.493 | 50 | 22 | 40 | 0.3198 | 0.6428 | 0.9698 |
| Implementation example 9 | 1.493 | 50 | 17 | 56 | 0.3198 | 0.8290 | 0.9698 |

Implementation Examples 10 to 20

In the implementation examples 10 to 20, as is shown in the above fourth preferred embodiment, a prism array sheet 10A with truncated square pyramid shaped projections 12 formed successively in the lateral and longitudinal directions on one surface of a transparent substrate 11 and a second prism array sheet 30 with a transparent substrate 31 on one surface of which triangular pillar shaped projections 32 are formed successively are used, and after the tip surfaces 12a of the truncated square pyramid shaped projections 12 are adhered to the light emitting side surface 21a of the surface light emitting device 20 of the comparison example 3, the transparent substrate 31 of this second prism array sheet 30 is installed on the light emitting side surface 14 which is the surface opposite to the surface on which the projections 12 are provided in the prism array sheet 10A so that the projections 32 provided on said second prism array sheet 30 are on the top surface on the opposite side.

Further, in these implementation examples 10 to 20, as the second prism array sheet 30 with a transparent substrate on projections 12 was 40° and the height h was 22 μm, in the implementation example 14 the apex angle θ of the above truncated square pyramid shaped projections 12 was 40° and the height h was 17 μm, in the implementation example 15 the apex angle θ of the above truncated square pyramid shaped projections 12 was 40° and the height h was 7 μm, in the implementation example 16 the apex angle θ of the above truncated square pyramid shaped projections 12 was 20° and the height h was 20 μm, in the implementation example 17 the apex angle θ of the above truncated square pyramid shaped projections 12 was 20° and the height h was 17 μm, in the implementation example 18 the apex angle θ of the above truncated square pyramid shaped projections 12 was 20° and the height h was 7 μm, in the implementation example 19 the apex angle θ of the above truncated square pyramid shaped projections 12 was 24° and the height h was 22 μm, and in the implementation example 20 the apex angle θ of the above truncated square pyramid shaped projections 12 was 64° and the height h was 16 μm.

TABLE 2

|  | Refractive index (n) | Projection part p (μm) | Projection part h (μm) | Projection part θ (°) | 1/n − 0.35 | sin θ | 1/n + 0.3 |
|---|---|---|---|---|---|---|---|
| Implementation example 10 | 1.493 | 50 | 22 | 60 | 0.3198 | 0.8660 | 0.9698 |
| Implementation example 11 | 1.493 | 50 | 17 | 60 | 0.3198 | 0.8660 | 0.9698 |
| Implementation example 12 | 1.493 | 50 | 7 | 60 | 0.3198 | 0.8660 | 0.9698 |
| Implementation example 13 | 1.493 | 50 | 22 | 40 | 0.3198 | 0.6428 | 0.9698 |
| Implementation example 14 | 1.493 | 50 | 17 | 40 | 0.3198 | 0.6428 | 0.9698 |
| Implementation example 15 | 1.493 | 50 | 7 | 40 | 0.3198 | 0.6428 | 0.9698 |
| Implementation example 16 | 1.493 | 50 | 20 | 20 | 0.3198 | 0.3420 | 0.9698 |
| Implementation example 17 | 1.493 | 50 | 17 | 20 | 0.3198 | 0.3420 | 0.9698 |
| Implementation example 18 | 1.493 | 50 | 7 | 20 | 0.3198 | 0.3420 | 0.9698 |
| Implementation example 19 | 1.493 | 50 | 22 | 24 | 0.3198 | 0.4067 | 0.9698 |
| Implementation example 20 | 1.493 | 50 | 16 | 64 | 0.3198 | 0.8988 | 0.9698 |

Implementation Examples 21 and 22

In the implementation examples 21 and 22, as is shown in the above fifth preferred embodiment, a prism array sheet 10D with circular truncated cone shaped projections 12 with shrunk tips formed successively in the lateral and longitudinal directions on one surface of a transparent substrate 11 is used, and the tip surfaces 12a of the circular truncated cone shaped projections 12 are adhered to the light emitting side surface 21a of the surface light emitting device 20 of the comparison example 3.

Further, in the implementation examples 21 and 22, as is shown in Table 3 below the above prism array sheet 10D used in both cases had a refractive index of 1.493 for a light wavelength of 550 nm, a pitch p of 50 μm of the above truncated square pyramid shaped projections 12, and an apex angle θ of 50° of the above truncated square pyramid shaped projections 12, while the height h of the projections 12 was 33 μm in the implementation example 21 but was 23 μm in the implementation example 22.

Implementation Examples 23 and 24

In the implementation examples 23 and 24, as is shown in the above sixth preferred embodiment, a prism array sheet 10E with circular truncated cone shaped projections 12 with shrunk tips and with their peripheral parts cut into a square shape formed successively in the lateral and longitudinal directions on one surface of a transparent substrate 11 is used, and the tip surfaces 12a of the circular truncated cone shaped projections 12 are adhered to the light emitting side surface 21a of the surface light emitting device 20 of the comparison example 3.

Further, in the implementation examples 23 and 24, as is shown in Table 4 below the above prism array sheet 10E used in both cases had a refractive index of 1.493 for a light wavelength of 550 nm, a pitch p of 50 μm of the above circular truncated cone shaped projections 12, and an apex angle θ of 50° of the above truncated square pyramid shaped projections 12, while the height h of the projections 12 was 33 μm in the implementation example 23 but was 28 μm in the implementation example 24.

TABLE 3

|  | Refractive index (n) | Projection part p (μm) | Projection part h (μm) | Projection part θ (°) | 1/n − 0.35 | sin θ | 1/n + 0.3 |
|---|---|---|---|---|---|---|---|
| Implementation example 21 | 1.493 | 50 | 33 | 50 | 0.3198 | 0.7660 | 0.9698 |
| Implementation example 22 | 1.493 | 50 | 23 | 50 | 0.3198 | 0.7660 | 0.9698 |

TABLE 4

| | Refractive index (n) | Projection part | | | 1/n − 0.35 | sin θ | 1/n + 0.3 |
| --- | --- | --- | --- | --- | --- | --- | --- |
| | | p (μm) | h (μm) | θ (°) | | | |
| Implementation example 23 | 1.493 | 50 | 33 | 50 | 0.3198 | 0.7660 | 0.9698 |
| Implementation example 24 | 1.493 | 50 | 28 | 50 | 0.3198 | 0.7660 | 0.9698 |

Further, the surface light emitting devices in each of the above comparison examples 3 and 4 and in the implementation examples 4 to 24 were made to emit light, and not only the light emission distribution characteristics were determined for the respective surface light emitters, but also the front luminance was obtained for each of the surface light emitters when the front luminance of the surface light emitter of the above comparison example 3 was taken as 1, and the value of the maximum brightness within a range of front direction ±15° is taken as the front luminance, and these values were indicated in the different figures.

Figure 31:
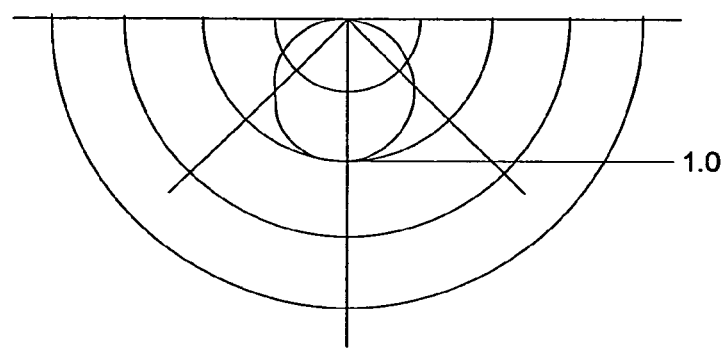
FIG. 31 is a diagram showing the light distribution characteristics of the surface light emitter of the comparison example 4.
Figure 32:
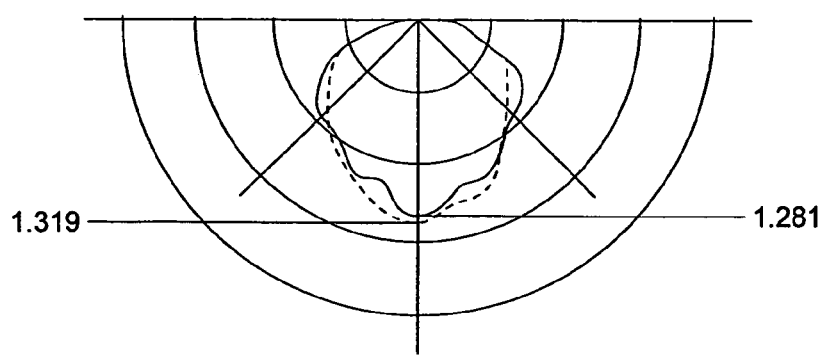
FIG. 32 is a diagram showing the light distribution characteristics of the surface light emitter of the comparison example 5.
Figure 33:
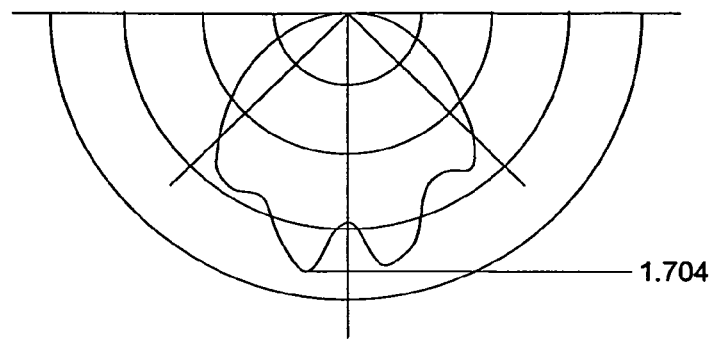
FIG. 33 is a diagram showing the light distribution characteristics of the surface light emitter of the implementation example 4.
Figure 34:
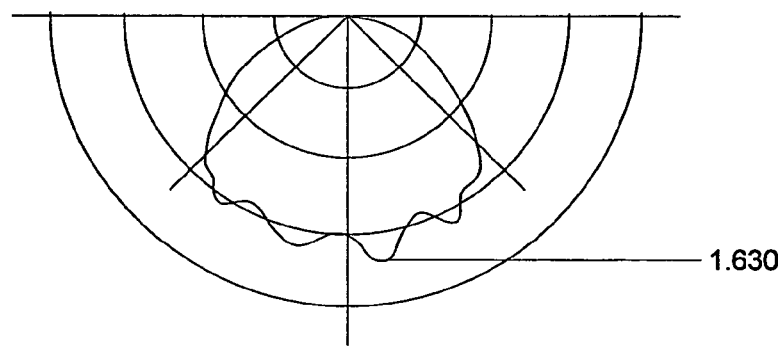
FIG. 34 is a diagram showing the light distribution characteristics of the surface light emitter of the implementation example 5.
Figure 35:
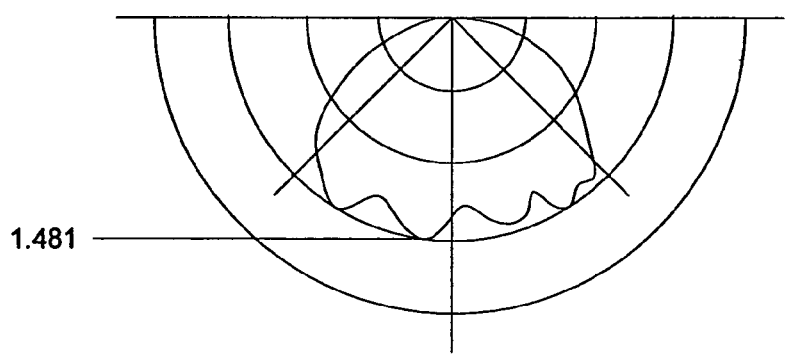
FIG. 35 is a diagram showing the light distribution characteristics of the surface light emitter of the implementation example 6.
Figure 36:
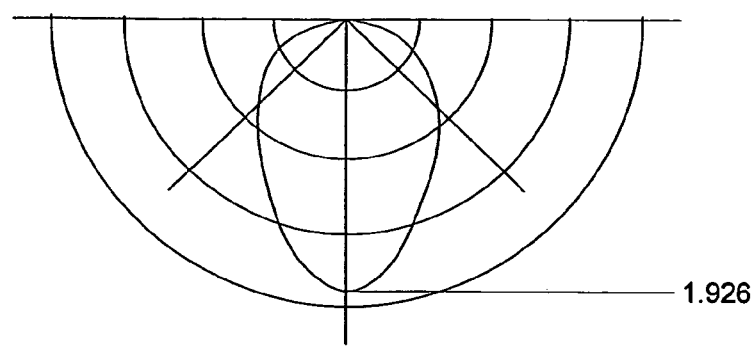
FIG. 36 is a diagram showing the light distribution characteristics of the surface light emitter of the implementation example 7.
Figure 37:
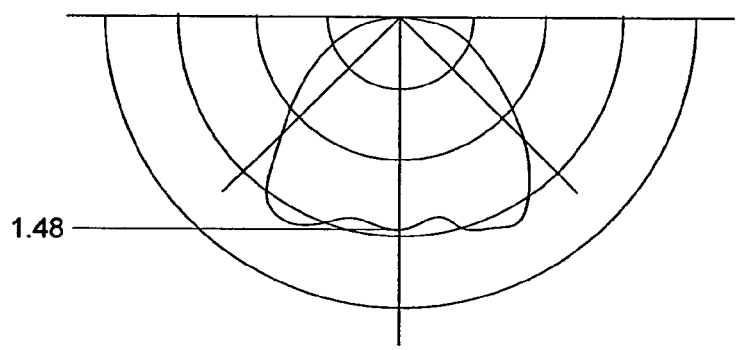
FIG. 37 is a diagram showing the light distribution characteristics of the surface light emitter of the implementation example 8.
Figure 38:
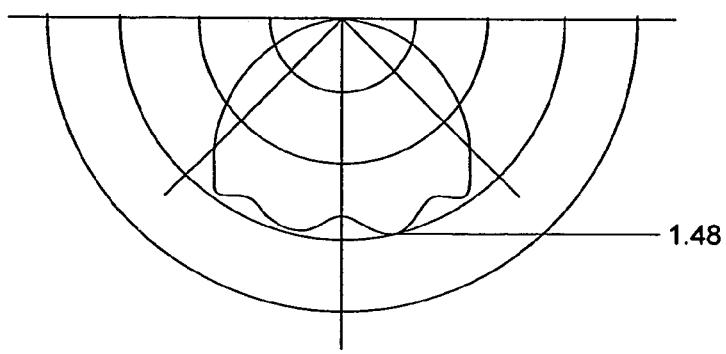
FIG. 38 is a diagram showing the light distribution characteristics of the surface light emitter of the implementation example 9.
Figure 39:
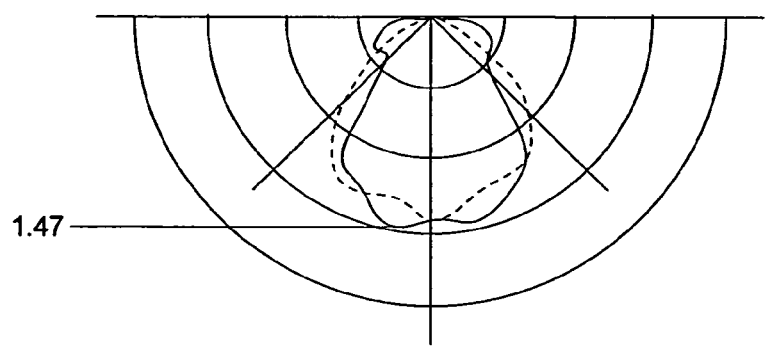
FIG. 39 is a diagram showing the light distribution characteristics of the surface light emitter of the implementation example 10.
Figure 40:
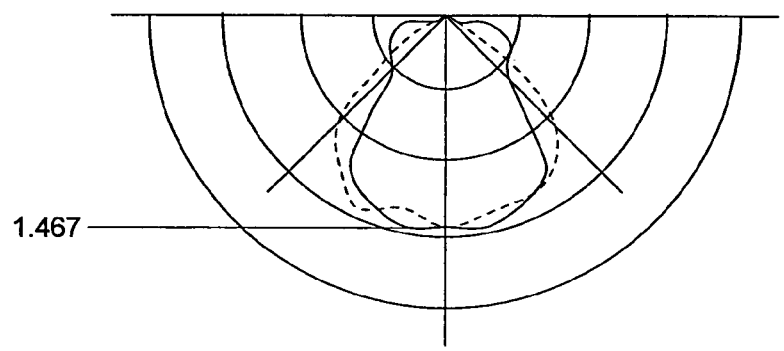
FIG. 40 is a diagram showing the light distribution characteristics of the surface light emitter of the implementation example 11.
Figure 41:
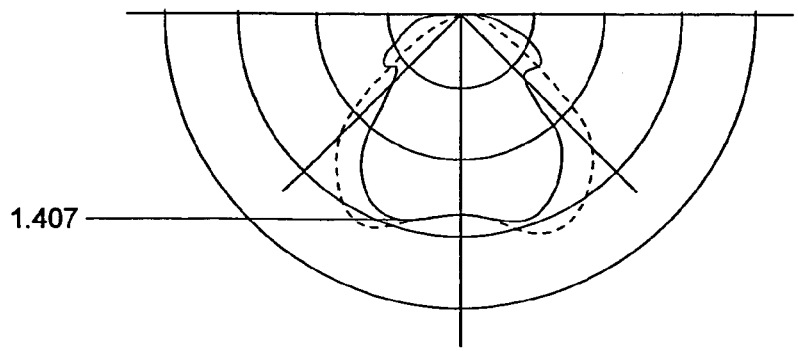
FIG. 41 is a diagram showing the light distribution characteristics of the surface light emitter of the implementation example 12.
Figure 42:
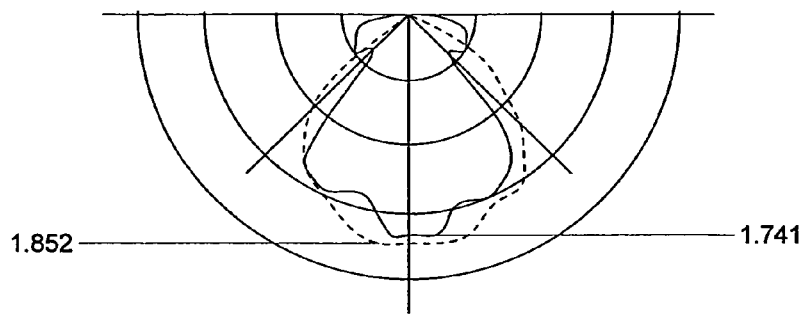
FIG. 42 is a diagram showing the light distribution characteristics of the surface light emitter of the implementation example 13.
Figure 43:
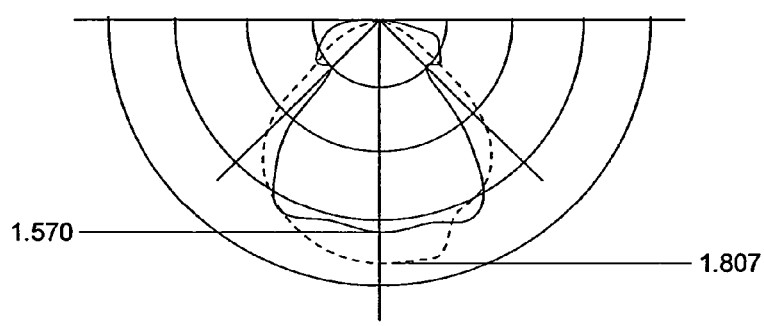
FIG. 43 is a diagram showing the light distribution characteristics of the surface light emitter of the implementation example 14.
Figure 44:
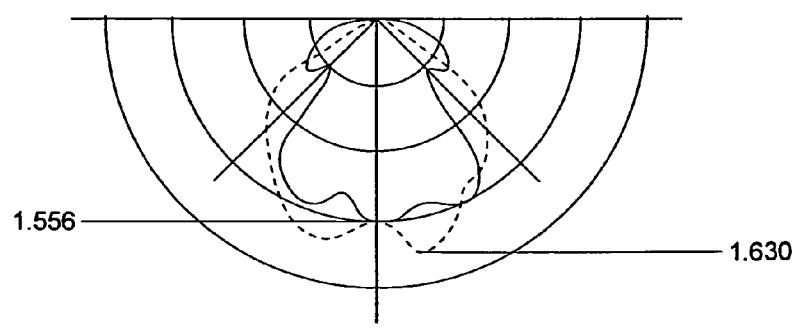
FIG. 44 is a diagram showing the light distribution characteristics of the surface light emitter of the implementation example 15.
Figure 45:
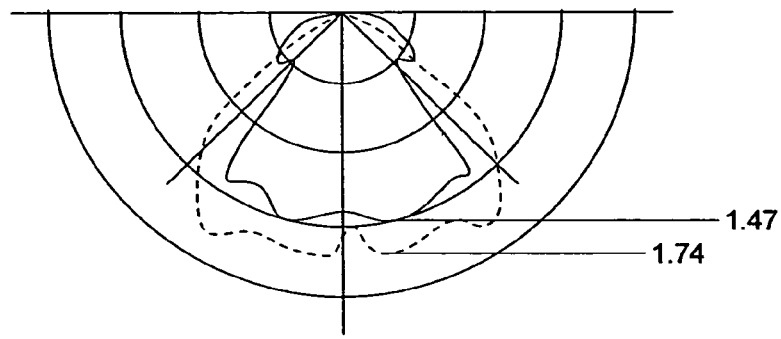
FIG. 45 is a diagram showing the light distribution characteristics of the surface light emitter of the implementation example 16.
Figure 46:
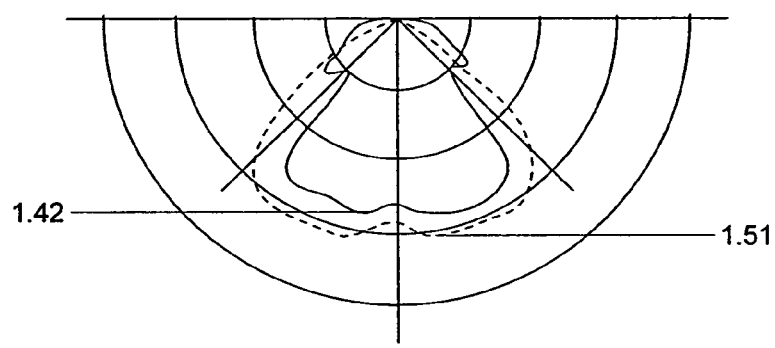
FIG. 46 is a diagram showing the light distribution characteristics of the surface light emitter of the implementation example 17.
Figure 47:
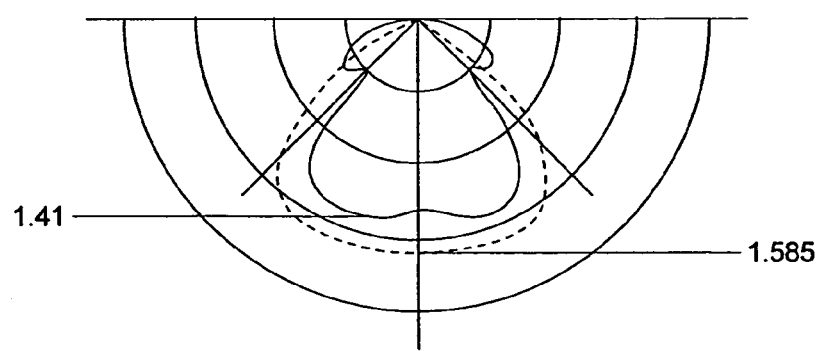
FIG. 47 is a diagram showing the light distribution characteristics of the surface light emitter of the implementation example 18.
Figure 48:
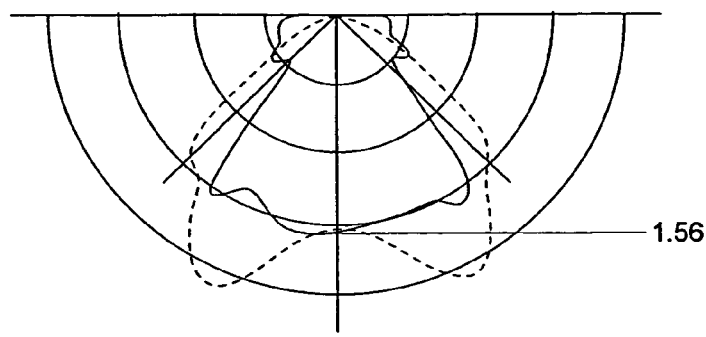
FIG. 48 is a diagram showing the light distribution characteristics of the surface light emitter of the implementation example 19.
Figure 49:
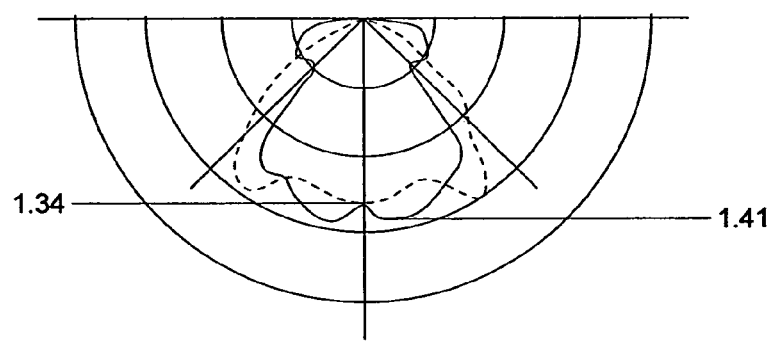
FIG. 49 is a diagram showing the light distribution characteristics of the surface light emitter of the implementation example 20.
Figure 50:
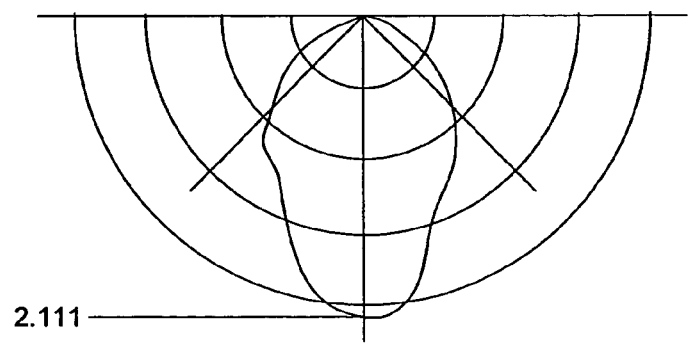
FIG. 50 is a diagram showing the light distribution characteristics of the surface light emitter of the implementation example 21.
Figure 51:
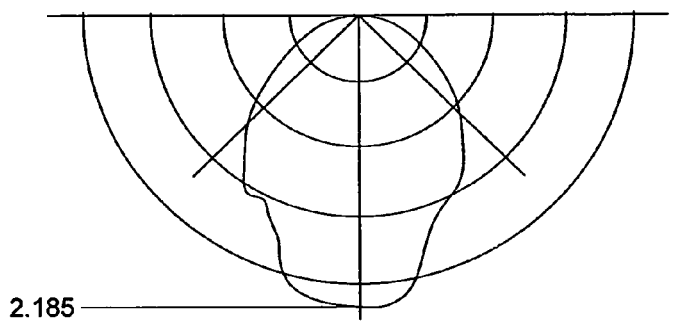
FIG. 51 is a diagram showing the light distribution characteristics of the surface light emitter of the implementation example 22.
Figure 52:
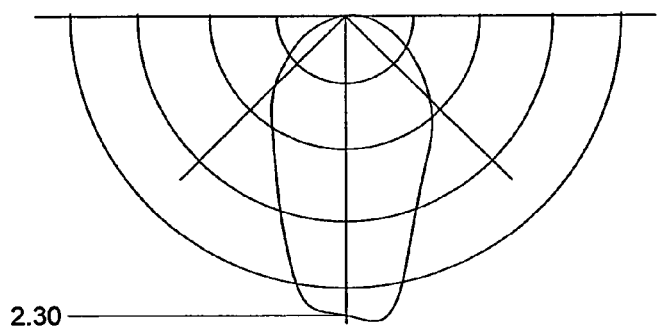
FIG. 52 is a diagram showing the light distribution characteristics of the surface light emitter of the implementation example 23.
Figure 53:
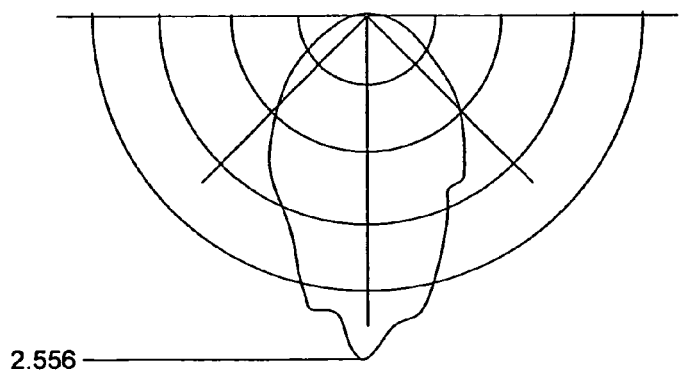
FIG. 53 is a diagram showing the light distribution characteristics of the surface light emitter of the implementation example 24.

Further, the results for the comparison example 3 are shown in FIG. 31, the results for the comparison example 4 are shown in FIG. 32, the results for the implementation example 4 are shown in FIG. 33, the results for the implementation example 5 are shown in FIG. 34, the results for the implementation example 6 are shown in FIG. 35, the results for the implementation example 7 are shown in FIG. 36, the results for the implementation example 8 are shown in FIG. 37, the results for the implementation example 9 are shown in FIG. 38, the results for the implementation example 10 are shown in FIG. 39, the results for the implementation example 11 are shown in FIG. 40, the results for the implementation example 12 are shown in FIG. 41, the results for the implementation example 13 are shown in FIG. 42, the results for the implementation example 14 are shown in FIG. 43, the results for the implementation example 15 are shown in FIG. 44, the results for the implementation example 16 are shown in FIG. 45, the results for the implementation example 17 are shown in FIG. 46, the results for the implementation example 18 are shown in FIG. 47, the results for the implementation example 19 are shown in FIG. 48, the results for the implementation example 20 are shown in FIG. 49, the results for the implementation example 21 are shown in FIG. 50, the results for the implementation example 22 are shown in FIG. 51, the results for the implementation example 23 are shown in FIG. 52, the results for the implementation example 24 are shown in FIG. 53. Further, in the surface light emitters of each of the comparison example 4 and of each of the implementation examples 10 to 20, in the prism array sheet 30 which is a transparent substrate 31 on one side of which triangular pillar shaped projections 32 are provided successively, the light distribution characteristics in the direction of arrangement of the triangular pillar shaped projections 32 is indicated by continuous line graphs and the light distribution characteristics in the longitudinal direction of the projections 32 is indicated by broken line graphs.

This result indicates that the front luminance of each of the surface light emitters of the implementation examples 4 to 24 have been improved greatly than the front luminance of the surface light emitters of the comparison examples 3 and 4, and in particular, in the surface light emitters in the implementation examples 21 to 24 that use the prism array sheets 10D and 10E in which truncated cone shaped projections with shrunk tip parts are formed on one surface of the transparent substrate 11, their front luminance has been improved even more largely.

In the surface light emitters of the preferred embodiments according to the present invention, by making the projections in the light control sheet get small towards the light emitting side surface of the surface light emitting device, it is possible to provide in the projections in the light control sheet inclined surfaces that are shrunk towards the tip surface of the projection.

Further, in the surface light emitters of the above preferred embodiments, it is desirable that the projections provided on one surface of the light control sheet have a truncated cone shape that is shrunk towards the tip surface of the projection.

In the surface light emitters of another preferred embodiments according to the present invention, by enlarging the projections in the light control sheet towards the light emitting side surface of the surface light emitting device, it is possible to provide in the projections in the light control sheet inclined surfaces that get large towards the tip surface of the projection.

Further, in the surface light emitters of the above preferred embodiments, it is desirable that the projections provided on one surface of the light control sheet have a truncated cone shape that get large towards the tip surface of the projection.

In the surface light emitters of a preferred embodiments according to the present invention, in adhering the projections of the light control sheet on to the light emitting side surface of the surface light emitting device, the adhering is done with an appropriate adhesive material having a high transparency so that the light emitted from the light emitting side surface of the surface light emitting device is guided appropriately in to the projections in the light control sheet.

Further, in the surface light emitters of a preferred embodiments according to the present invention, it is possible to provide a concavoconvex structure in the light emitting side surface of the light control sheet on the side opposite to the surface of the sheet light control sheet on which the projections are provided that are adhered to the light emitting side surface of the above surface light emitting device.

In addition, in the surface light emitters of another preferred embodiments according to the present invention, on the light emitting side surface of the light control sheet on the side opposite to the surface of the light control sheet on which the projections are provided that are adhered to the light emitting side surface of the above surface light emitting device, it is possible to provide a second light control sheet having a concavoconvex structure so that the concavoconvex structure is positioned on the opposite side of the light emitting side surface of the above light control sheet. Further, in providing the second light control sheet so that its concavoconvex structure is on the side opposite to the of the light emitting side surface of the above light control sheet, apart from adhering the second light control sheet to the light emitting side surface of the above first light control sheet, it is possible also to merely place the second light control sheet on the light emitting side surface of the first light control sheet, or to provide it so that there is a slight spacing from the light emitting side surface of the above first light control sheet.

In a liquid crystal display apparatus according to an embodiment of the present invention, a surface light emitting device forming a surface light emitter is provided with a plurality of pixels placed in a planar matrix.

Further, in a second display apparatus according to the present invention, it is desirable that the pitch of the concavoconvex structure in the light control sheet of said surface light emitter is made to be equal to the pitch of said pixels.

As in a preferred embodiment of the present invention, in affixing a light control sheet on the light emitting side surface of a surface light emitting device that emits light from a surface light emitting device, by making the projection provided in the concavoconvex structure provided in one surface of a light control sheet get small towards the light emitting side surface of the surface light emitting device, and by not only adhering this tip surface of the shrunk projection to the light emitting side surface of the surface light emitting device, but also by packing a transparent material with a lower refractive index than the above sheet light control sheet in the space part formed between the projection of the sheet light control sheet and the light emitting side surface of the surface light emitting device, the light that would get totally reflected at the light emitting side surface of the surface light emitting device if the light control sheet is not provided will not be reflected at the part where the tip surface of the projection in the light control sheet has been adhered but will be guided into the interior of the light control sheet.

Further, most of the light that is guided into the interior of the light control sheet in this manner is totally reflected at the boundary between the space part and the projection that has been shrunk towards the light emitting side surface of the surface light emitting device, and this totally reflected light is guided to and emitted from the light emitting side surface of the light control sheet.

As a result of this, in a surface light emitter according to the preferred embodiments of the present invention, the front luminance of the light that is emitted through the above sheet light control sheet towards the front and in the range of ±30° from the front gets improved greatly.

Further, in a surface light emitter according to the present preferred embodiment, if the projection provided on one surface of the above light control sheet is made of a circular truncated cone shape that is shrunk towards the tip surface as above, the front luminance of the light that is emitted through the above sheetlight control sheet towards the front and in the range of ±30° from the front gets further improved greatly.

Further, as in another preferred embodiments of the present invention, in affixing a light control sheet to the light emitting side surface of the surface light emitting device that emits the light emitted from a surface light emitting device, if the projections in the concavoconvex structure provided on one side of the light control sheet are enlarged towards the light emitting side surface of the surface light emitting device, and if not only the tip surface of the this enlarged projection part is adhered to the light emitting side surface of the surface light emitting device but also a transparent material with a larger refractive index than that of the above light control sheet is packed in the space part between the projections of the light control sheet and the light emitting side surface of the surface light emitting device, the light that would get totally reflected at the light emitting side surface of the surface light emitting device if the light control sheet is not provided will not be reflected at the boundary between the space part in which a transparent material with a larger refractive index than the light control sheet has been packed and the light emitting side surface of the surface light emitting device, but will be guided into the interior of the space part in which the transparent material with a large refractive index has been packed.

Further, most of the light that is guided into the interior of the space part in which the transparent material with a large refractive index has been packed is totally reflected at the boundary between the space part and the projection that has been shrunk towards the light emitting side surface of the surface light emitting device, and this totally reflected light is guided from the space part in which the transparent material with a large refractive index has been packed to and emitted from the light emitting side surface of the light control sheet.

As a result of this, in a surface light emitter according to the preferred embodiments of the present invention, similar to the surface light emitter according to the above preferred embodiments, the front luminance of the light that is emitted through the above sheetlight control sheet gets improved greatly.

Further, in a surface light emitter according to the present preferred embodiment, if the projection provided on one surface of the above light control sheet is made of a circular truncated cone shape that gets large towards the tip surface, the front luminance of the light that is emitted through the above sheetlight control sheet towards the front and in the range of ±30° from the front gets further improved greatly.

In addition, in the surface light emitters of these preferred embodiments, if a concavoconvex structure is provided in the surface (the light emitting side surface) of the light control sheet on the side opposite to the surface of the sheetlight control sheet on which the projections are provided that are adhered to the light emitting side surface of the above surface light emitting device, the light that is totally reflected at the light emitting side surface of this light control sheet gets suppressed, and hence the front luminance of the light that is emitted through the above sheetlight control sheet gets improved greatly.

Further, in the surface light emitters of these preferred embodiments, if a second light control sheet having a concavoconvex structure is provided on the light emitting side surface opposite to the surface of the light control sheet on which the projections that are adhered to the light emitting side surface of the surface light emitting device are provided so that the concavoconvex structure on the second light control sheet are present on the side opposite to the light emitting side surface of the above light control sheet, the light that gets emitted at an angle from the above light emitting side surface of the light control sheet gets refracted by the concavoconvex structure in this second light control sheet and gets focused towards the front, and hence the front luminance of the light emitted via this second light control sheet gets further improved.

Further, as in a display apparatus of the preferred embodiment according to the present invention, if a display device and a surface light emitter according to a preferred embodiment of the present invention are provided thereby using the surface light emitter as a back light for the display device, the light with a high front luminance emitted from the light emitting side surface of the surface light emitter is guided into the display device, and hence it becomes possible to display with a high brightness.

Further, as in a display apparatus of the preferred embodiment according to the present invention, if the surface light emitting devices constituting the surface light emitter according to a preferred embodiment of the present invention are provided for a plurality of pixels arranged in a planar matrix, the front luminance of the light emitted for each pixel becomes high, and hence it becomes possible to display with a high brightness.

Figure 54:
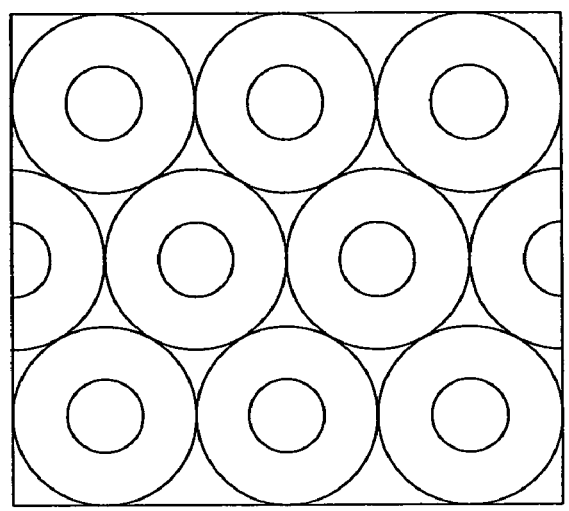
FIG. 54 is a plan view diagram of the surface, with projections of truncated circular cones in a hexagonal lattice, on the side opposite to the light emitting side surface of the light control sheet of another embodiment.
Figure 55:
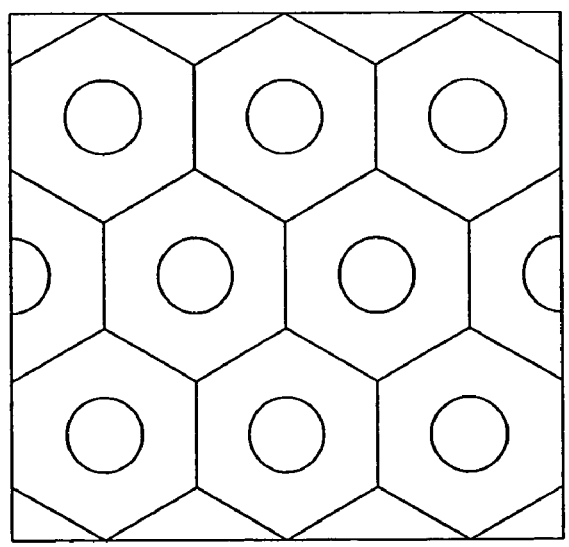
FIG. 55 is a plan view diagram of the surface, with projections of truncated circular cones in a hexagonal lattice, on the side opposite to the light emitting side surface of the light control sheet of another embodiment.

Another embodiment is a light control sheet with a plurality of projections in a hexagonal lattice. With this type of the light control sheet, the brightness in the front direction is brighter than square lattice type by 10%-20%. Because it can takes the most suitable ratio of the bonded part in almost all directions. FIG. 54, shows a plan view diagram of the surface, with projections of truncated circular cones in a hexagonal lattice, on the side opposite to the light emitting side surface of the light control sheet of another embodiment. FIG. 55 shows a plan view diagram of the surface, with projections of truncated circular cones in a hexagonal lattice, on the side opposite to the light emitting side surface of the light control sheet of another embodiment.

This invention can apply to lightings without glares when monitors of personal computers are used under the lightings operators don't feel so dazzle with glares of the monitor. Because this surface light emitter has higher brightness of front direction than lighting apparatuses of prior art, but has lower brightness of 45 degree direction than that.

The concavoconvex structure may be coated with the material which is transparent to the emitted light. It is better that the surface of the concavoconvex structure is specular finish, but we often scathe the surface when we make the concavoconvex structure. The coating makes the surface specular so that light rays reflect totally or pass the concavoconvex structure. And we can treat the light control sheet easier cause of the scratch resistant coating.

An embodiment of the present invention is suitable for back light emitter of display apparatus like LCD. Because its planar emitting side surface can connect to the back surface of display apparatus without any space.

In an office or house we need antifouling coating or hard coating on lighting apparatus. With an embodiment of the present invention we can coat easily with painting or depositing to the emitter because the emitting side surface is flat. And we can maintain surface cleanly.

This invention can apply to a cylinder surface light emitter like a striplight lamp. The projections of the light control sheet are bonded to the cylinder surface of the lamp, and we can obtain 10% brighter lighting without fruitless scattering.

What is claimed is:

1. A surface light emitter, comprising:
a surface light emitting device which generates light itself and emits the light; and
a light control sheet which is provided with a concavoconvex structure on at least one surface of the light control sheet and is attached to an emitting side surface of the surface light emitting device, wherein a projection of the concavoconvex structure on the one surface of the light control sheet gets small toward the emitting side surface of the surface light emitting device and has a plane part on a tip of the projection, the plane part on the tip of the projection is bonded to the emitting side surface of the surface light emitting device, so that the light generated by the surface light emitting device enters the projection of the light control sheet through the plane part, and transparent material, whose refraction index is smaller than a refraction index of the light control sheet, is filled in a space between the projection of the light control sheet and the emitting side surface of the surface light emitting device, so that the light generated by the surface light emitting device enters the space directly through the emitting side surface.

2. The surface light emitter of claim 1, wherein the projection provided on the one surface of the light control sheet has a surface which is uniformly declined so that the projection gets small toward the plane part on the tip of the projection.

3. The surface light emitter of claim 2, wherein an apex angle of the projection provided on the one surface of the light control sheet and a refraction index of the light control sheet satisfy the following relationship:$(1/n-0.35)<\sin\theta<(1/n+0.3)$ wherein: $\theta$. is the apex angle; n is the refraction index.

4. The surface light emitter of claim 1, wherein the projection provided on the one surface of the light control sheet has a circular truncated cone shape which gets small toward the plane part on the tip of the projection.

5. The surface light emitter of claim 4, wherein an apex angle of the projection provided on the one surface of the light control sheet and a refraction index of the light control sheet satisfy the following relationship:$(1/n-0.35)<\sin\theta<(1/n+0.3)$ wherein: $\theta$ is the apex angle; n is the refraction index.

6. The surface light emitter of claim 1, wherein the projection provided on the one surface of the light control sheet has a polygon truncated cone shape which gets small toward the plane part on the tip of the projection.

7. The surface light emitter of claim 1, wherein a height and a pitch of the projection provided on the one surface of the light control sheet satisfy the following relationship: $0.28p<h<1.1p$ wherein: h is the height; p is the pitch.

8. The surface light emitter of claim 1, wherein a second concavoconvex structure is provided on an emitting side surface of the light control sheet opposite to a side on which the concavoconvex structure bonded to the emitting side surface of the surface light emitting device is provided.

9. The surface light emitter of claim 8, wherein a pitch of the concavoconvex structure provided on the light control sheet and bonded to the emitting side surface of the light emitting device and a pitch of the second concavoconvex structure provided on the emitting side surface of the light control sheet are identical.

10. The surface light emitter of claim 1, wherein the surface light emitting device comprises a matrix of a plurality of pixels.

11. A surface light emitter, comprising:
a surface light emitting device which emits light; and
a light control sheet which is provided with a concavoconvex structure on at least one surface of the light control sheet and is attached to an emitting side surface of the surface light emitting device, wherein a projection of the concavoconvex structure on the one surface of the light control sheet gets large toward the emitting side surface of the surface light emitting device and has a plane part on a tip of the projection, the plane part on the tip of the projection is bonded to the emitting side surface of the surface light emitting device, and transparent material, whose refraction index is larger than an index of refraction of the light control sheet, is injected and filled in a space between the projection of the light control sheet and the emitting side surface of the surface light emitting device.

12. The surface light emitter of claim 11, wherein the projection provided on the one surface of the light control sheet has a surface which is uniformly declined so that the projection gets large toward the plane part on the tip of the projection.

13. The surface light emitter of claim 11, wherein the projection provided on the one surface of the light control sheet has a circular truncated cone shape which gets large toward the plane part on the tip of the projection.

14. The surface light emitter of claim 11, wherein the projection provided on the one surface of the light control sheet has a polygon truncated cone shape which gets large toward the plane part on the tip of the projection.

15. The surface light emitter of claim 11, wherein a second concavoconvex structure is provided on an emitting side surface of the light control sheet opposite to a side on which the concavoconvex structure bonded to the emitting side surface of the surface light emitting device is provided.

16. The surface light emitter of claim 11, comprising: a second light control sheet which is provided with a second concavoconvex structure on a first surface, wherein a second surface of the second light control sheet opposite to the first surface on which the concavoconvex structure is provided faces the emitting side surface of the light control sheet attached to the emitting side surface of the surface light emitting device.

17. The surface light emitter of claim 11, wherein the surface light emitting device itself generates the light.

18. A surface light emitter, comprising:
a surface light emitting device which generates light itself and emits the light;
a light control sheet which is provided with a concavoconvex structure on at least one surface of the light control sheet and is attached to an emitting side surface of the surface light emitting device, wherein a projection of the concavoconvex structure on the one surface of the light control sheet gets small toward the emitting side surface of the surface light emitting device and has a plane part on a tip of the projection, the plane part on the tip of the projection is bonded to the emitting side surface of the surface light emitting device, and transparent material, whose refraction index is smaller than a refraction index of the light control sheet, is filled in a space between the projection of the light control sheet and the emitting side surface of the surface light emitting device; and
a second light control sheet which is provided with a second concavoconvex structure on a first surface, wherein a second surface of the second light control sheet opposite to the first surface on which the second concavoconvex structure is provided faces the emitting side surface of the light control sheet attached to the emitting side surface of the surface light emitting device.

19. The surface light emitter of claim 18, wherein a pitch of the concavoconvex structure of the light control sheet attached to the emitting side surface of the light emitting device and a pitch of the second concavoconvex structure provided on the second light control sheet are identical.

20. The surface light emitter of claim 18, wherein the light generated by the surface light emitting device enters the projection of the light control sheet through the plane part and the light generated by the surface light emitting device enters the space directly through the emitting side surface.

21. A display apparatus-comprising:
a surface light emitter, comprising:
a surface light emitting device which generates light itself and emits the light; and
a light control sheet which is provided with a concavoconvex structure on at least one surface of the light control sheet and is attached to an emitting side surface of the surface light emitting device, wherein a projection of the concavoconvex structure on the one surface of the light control sheet gets small toward the emitting side surface of the surface light emitting device and has a plane part on a tip of the projection, the plane part on the tip of the projection is bonded to the emitting side surface of the surface light emitting device, and transparent material, whose refraction index is smaller than a refraction index of the light control sheet, is filled in a space between the projection of the light control sheet and the emitting side surface of the surface light emitting device;
a transmissive display device which comprises a plurality of pixels and is disposed facing the light control sheet of the surface light emitter: wherein the surface light emitter operate as a back light for illuminating the transmissive display device.

22. A display apparatus comprising:
a surface light emitter, comprising:
a surface light emitting device which emits light; and
a light control sheet which is provided with a concavoconvex structure on at least one surface of the light control sheet and is attached to an emitting side surface of the surface light emitting device, wherein a projection of the concavoconvex structure on the one surface of the light control sheet gets large toward the emitting side surface of the surface light emitting device and has a plane part on a tip of the projection, the plane part on the tip of the projection is bonded to the emitting side surface of the surface light emitting device, and transparent material, whose refraction index is larger than an index of refraction of the light control sheet, is injected and filled in a space between the projection of the light control sheet and the emitting side surface of the surface light emitting device;
a transmissive display device which is disposed facing the light control sheet of the surface light emitter: wherein the surface light emitter operate as a back light.

23. The display apparatus of claim 22, wherein the surface light emitting device itself generates the light.

* * * * *